Jan. 30, 1962 — E. G. DE CORIOLIS ETAL — 3,019,007
METAL ARTICLE TREATING APPARATUS
Filed May 5, 1958 — 15 Sheets-Sheet 5
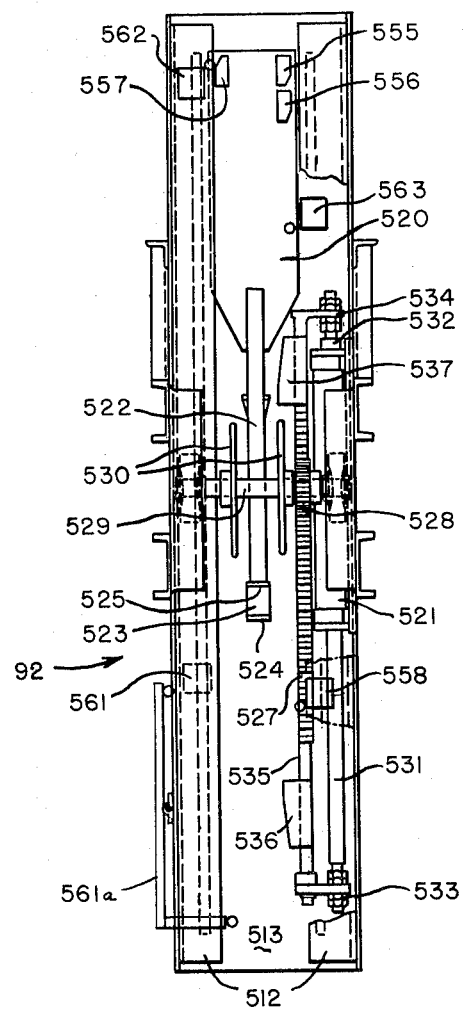
Fig. V
INVENTORS
ERNEST G. DE CORIOLIS
BY PIERRE DE CORIOLIS, GUARDIAN
CLARKE C. SYKES
BY
Charles H. Haughey
ATTORNEY

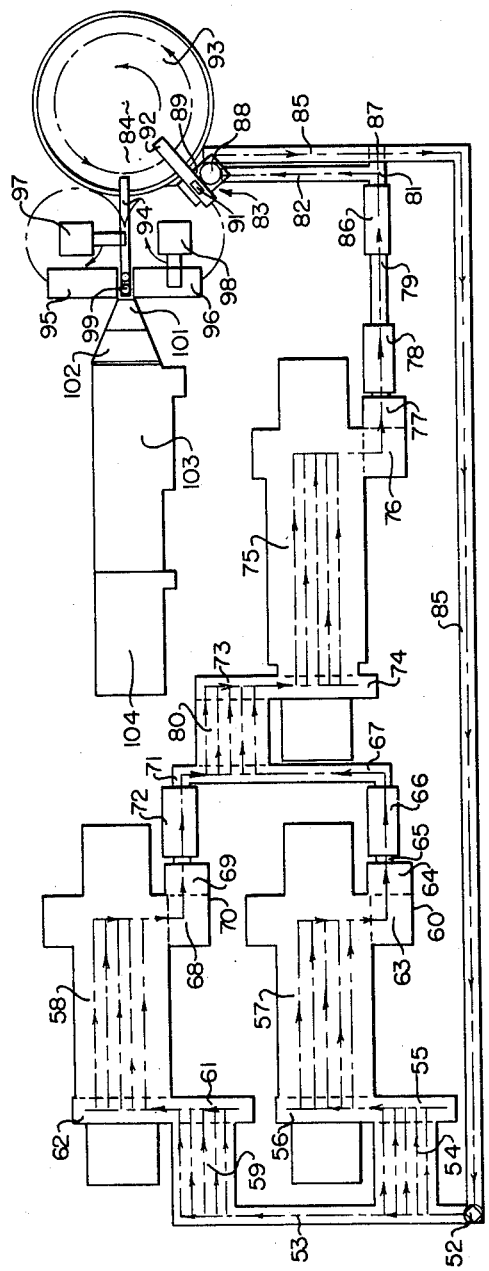
Fig. I
INVENTORS.
ERNEST G. deCORIOLIS
BY PIERRE DE CORIOLIS, GUARDIAN
CLARKE C. SYKES
BY
ATTORNEY

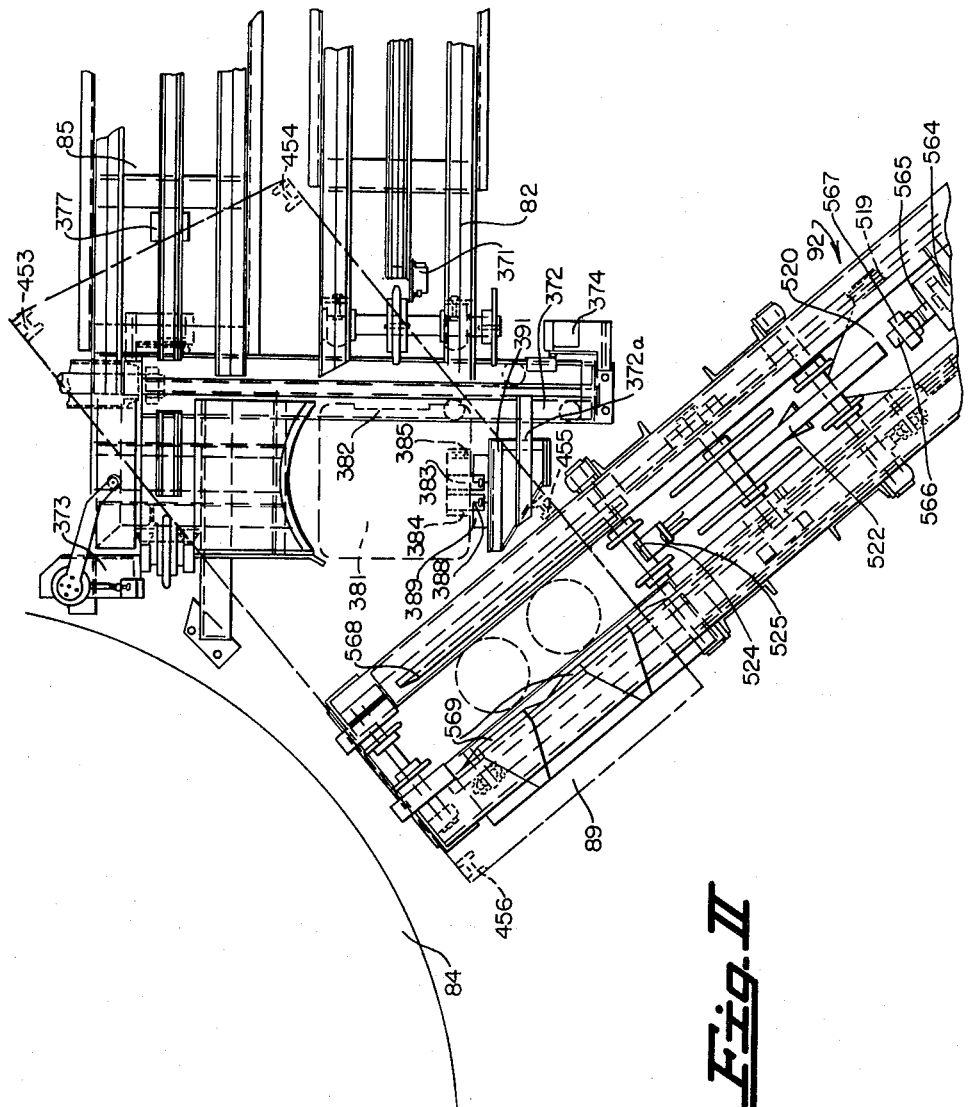

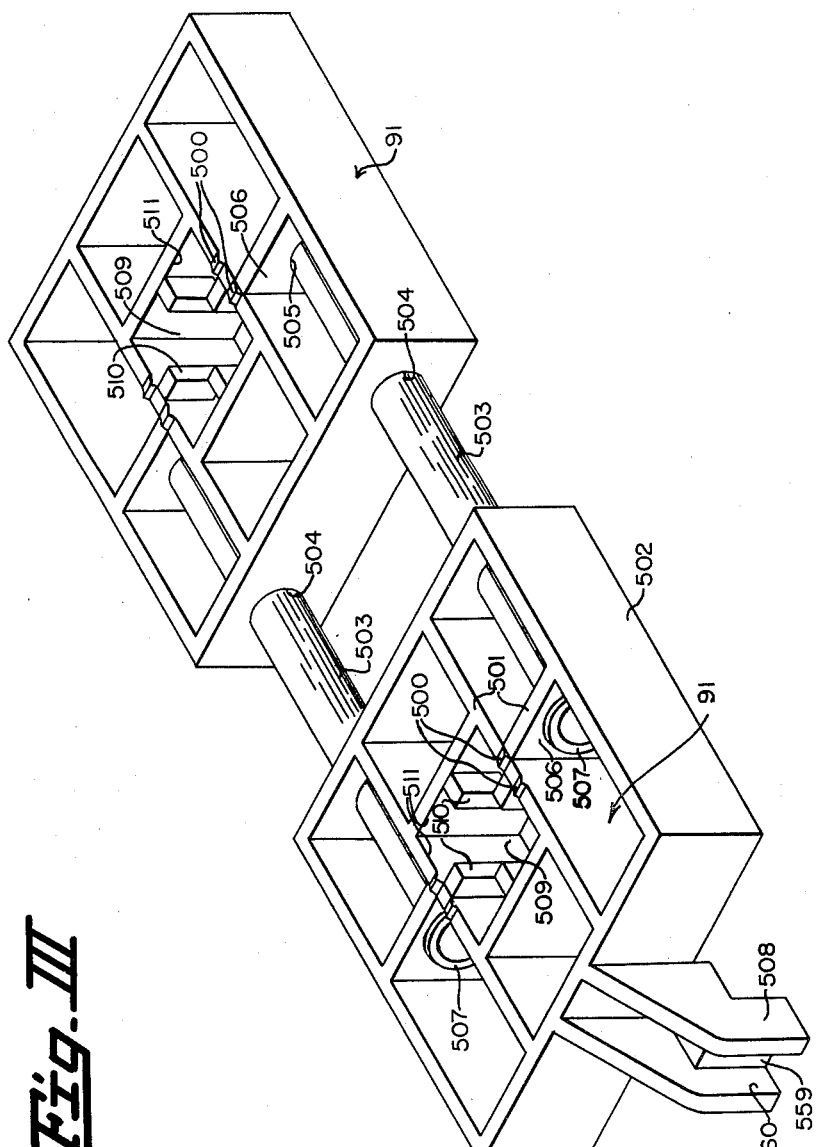

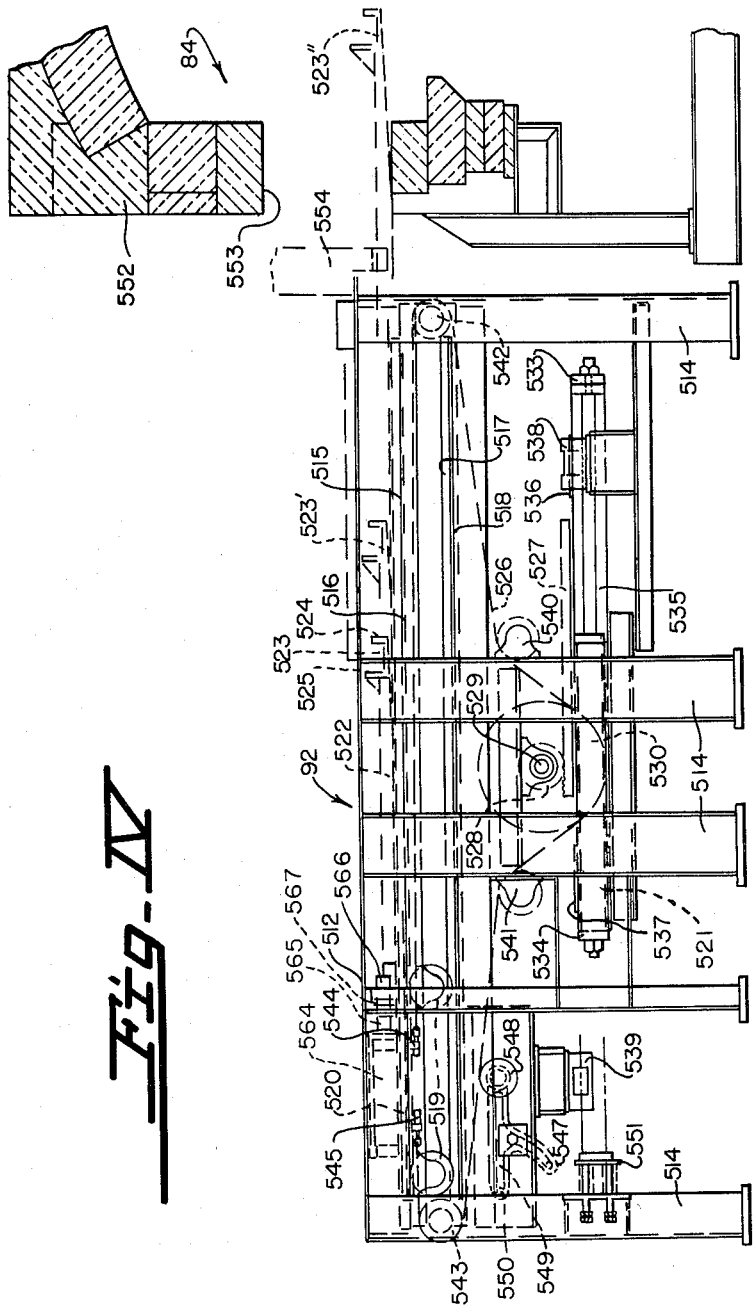

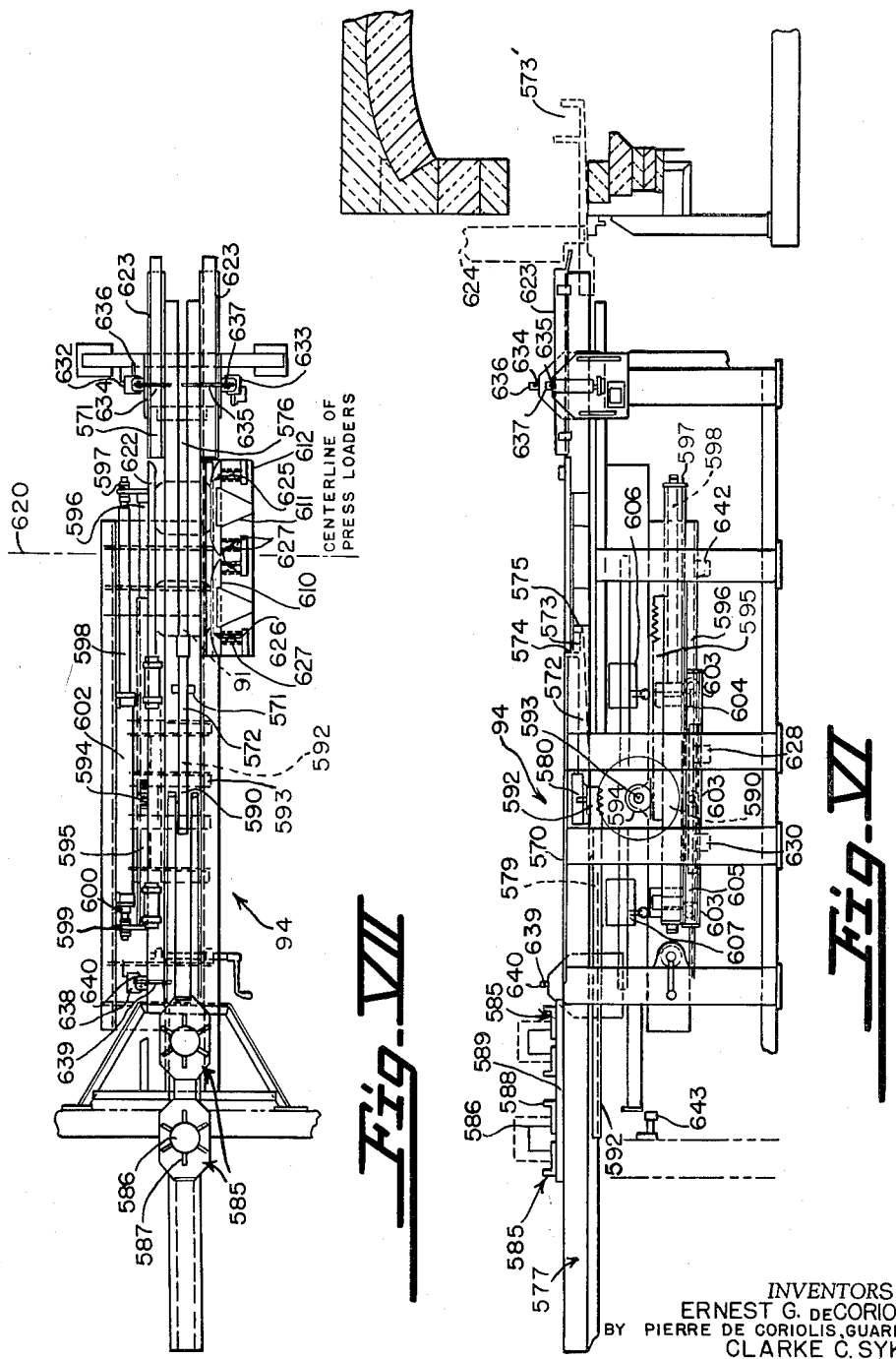

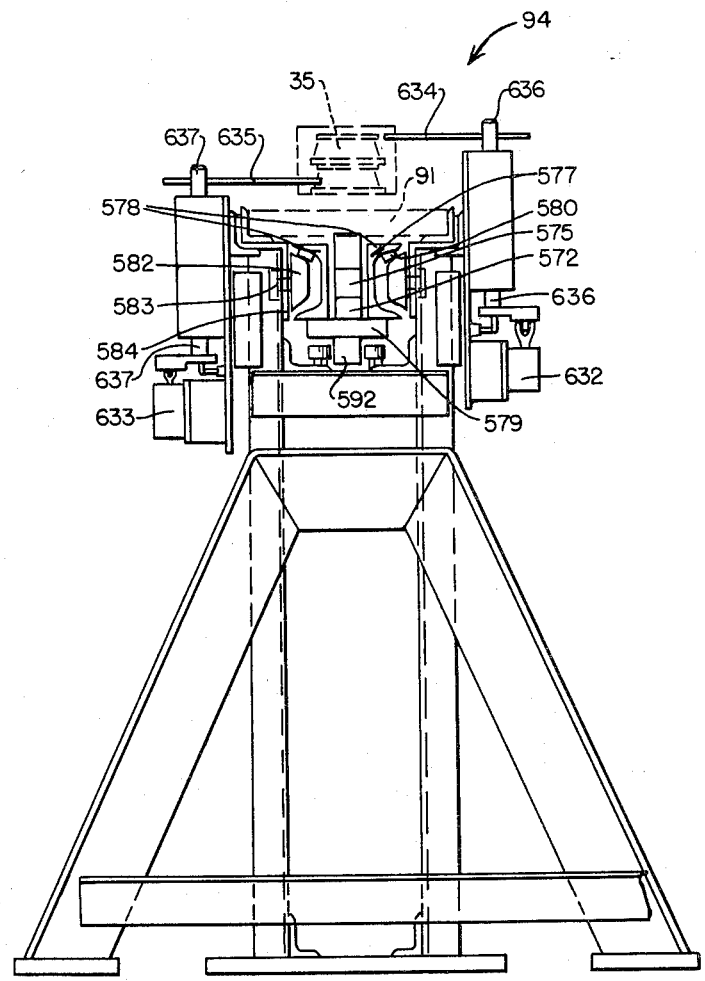
Fig. VIII

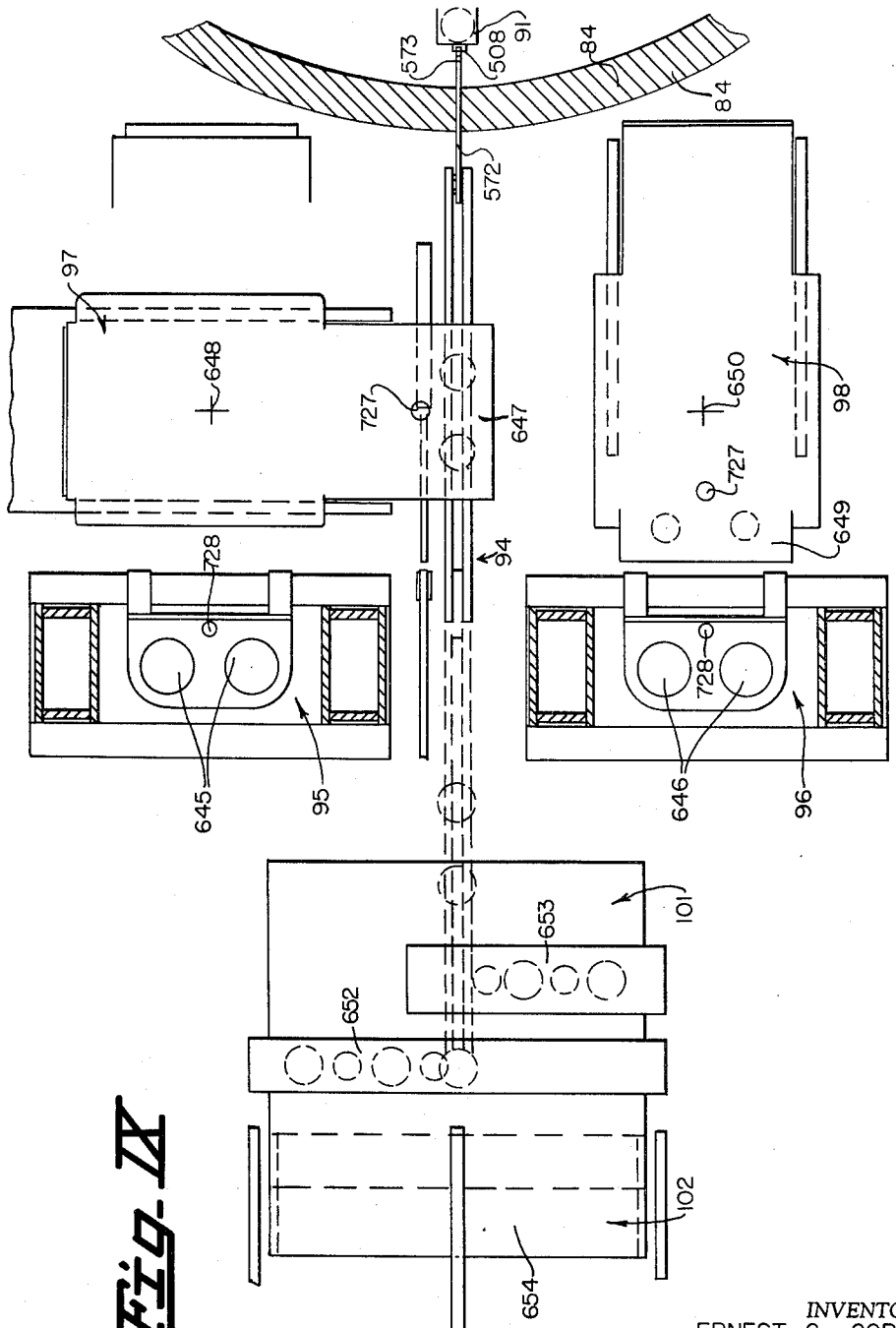

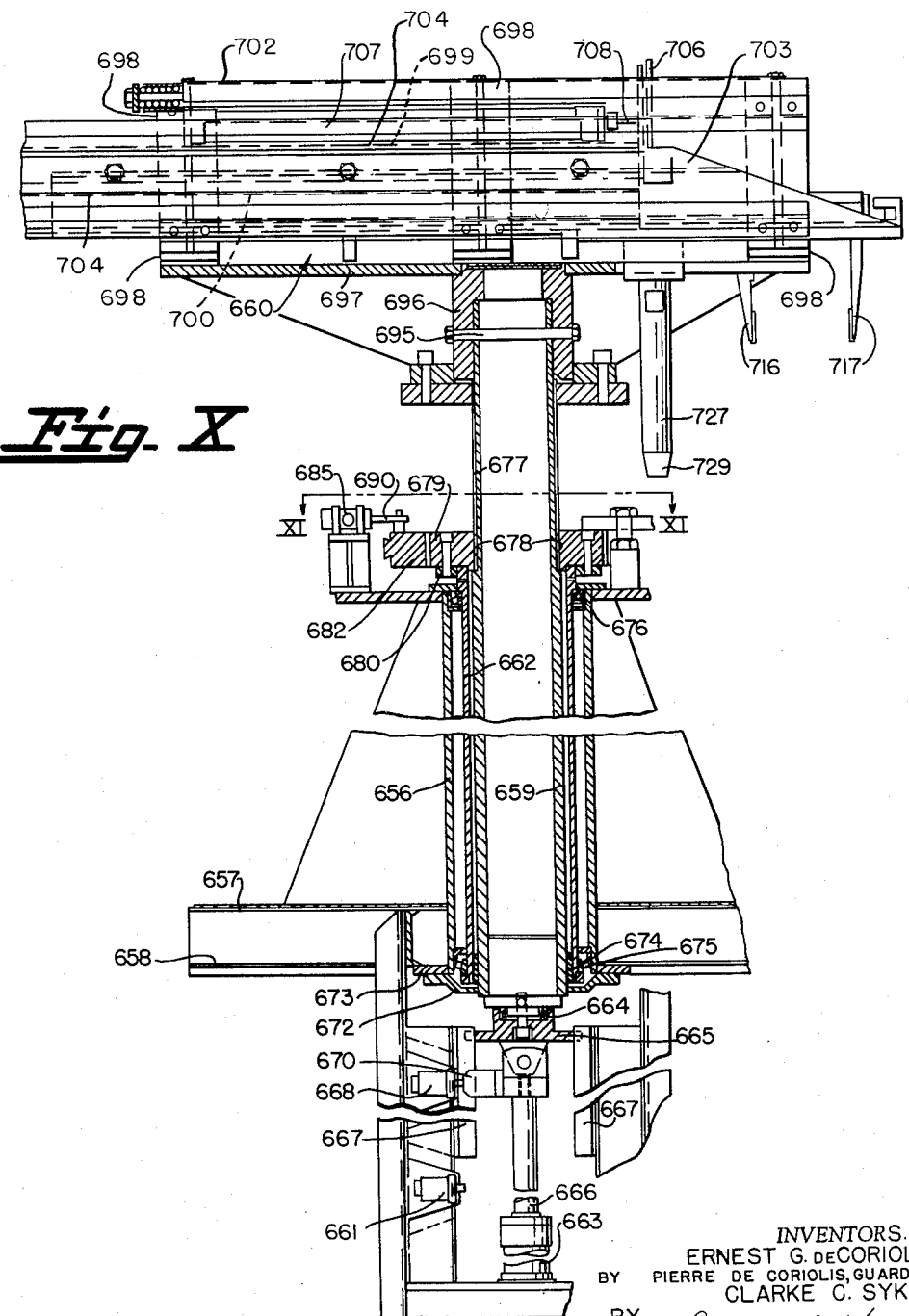

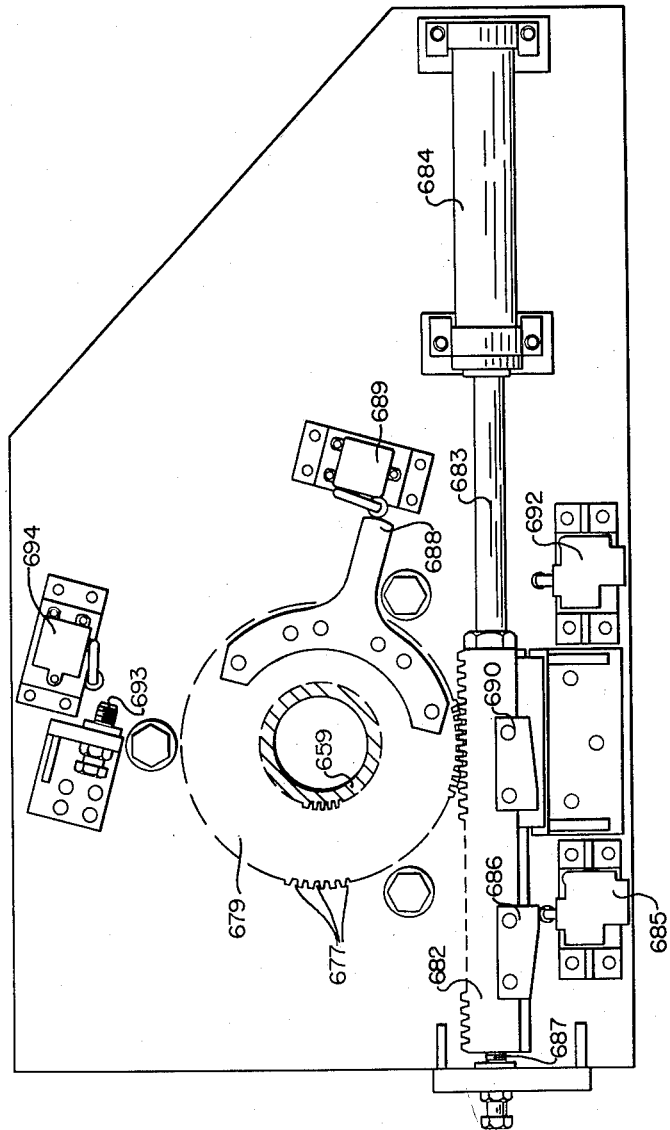

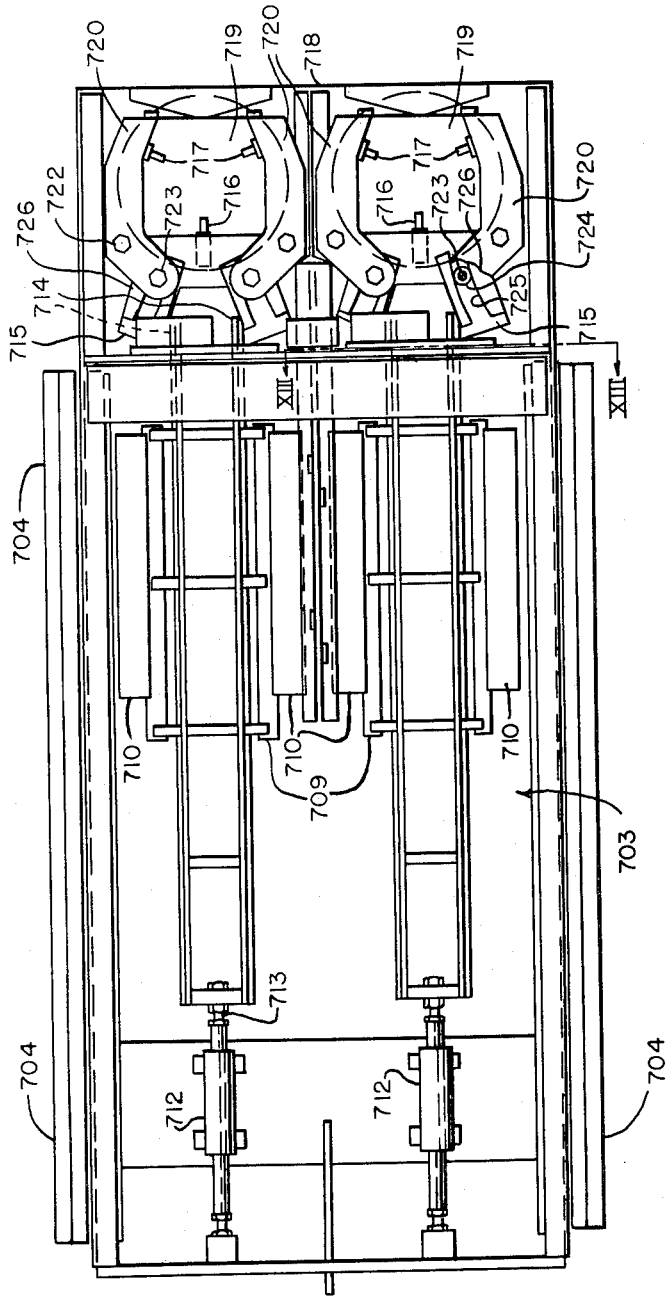

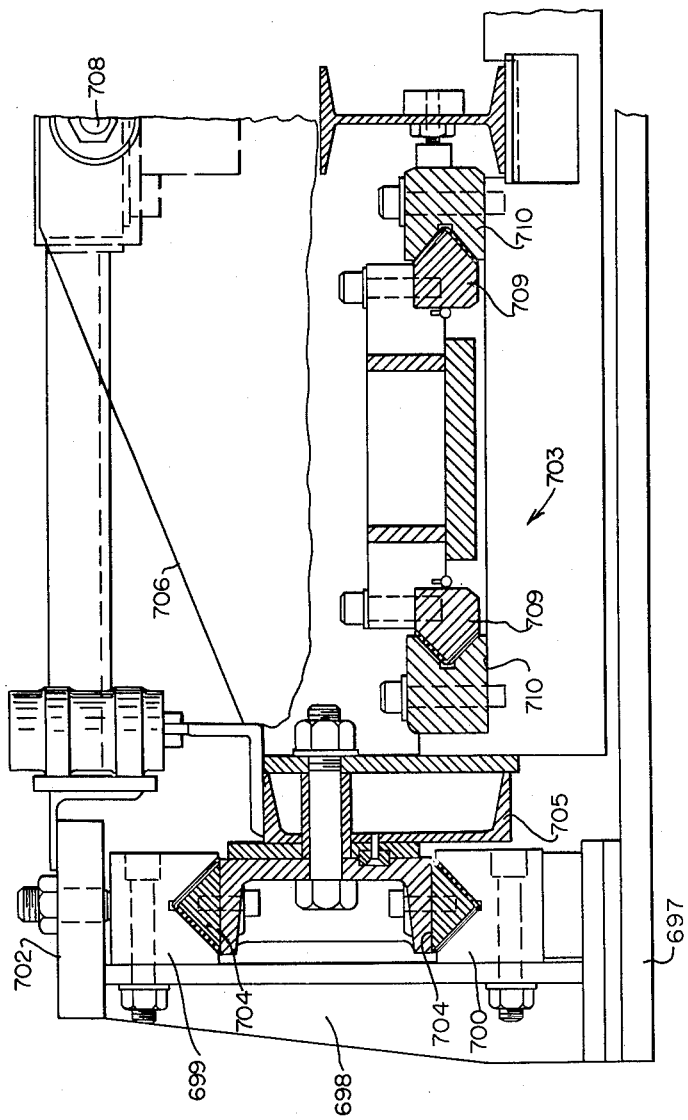

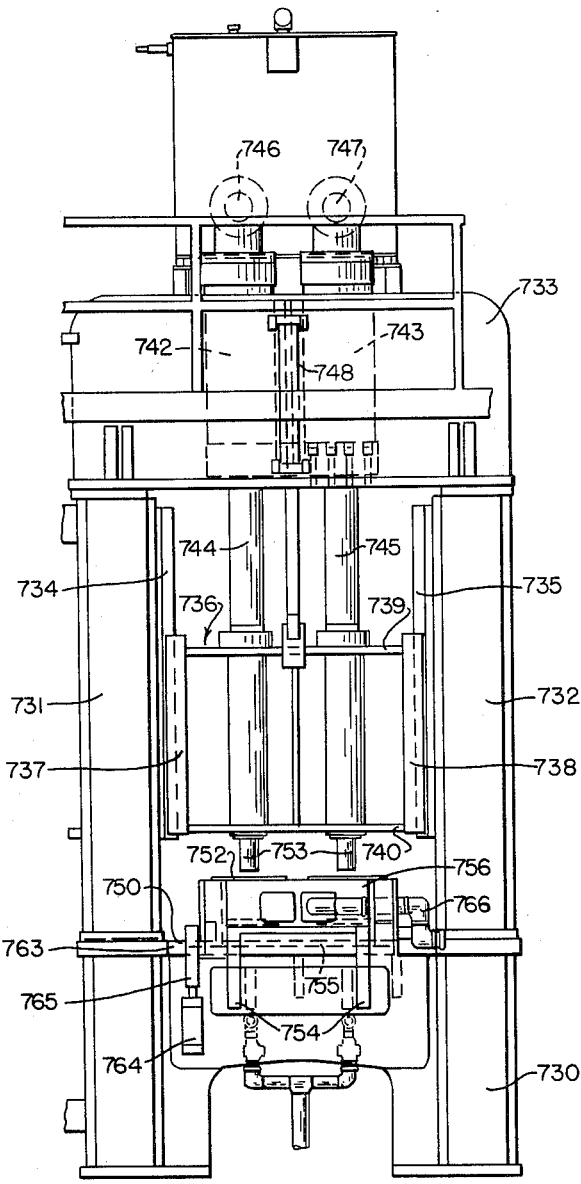
Fig. XIV

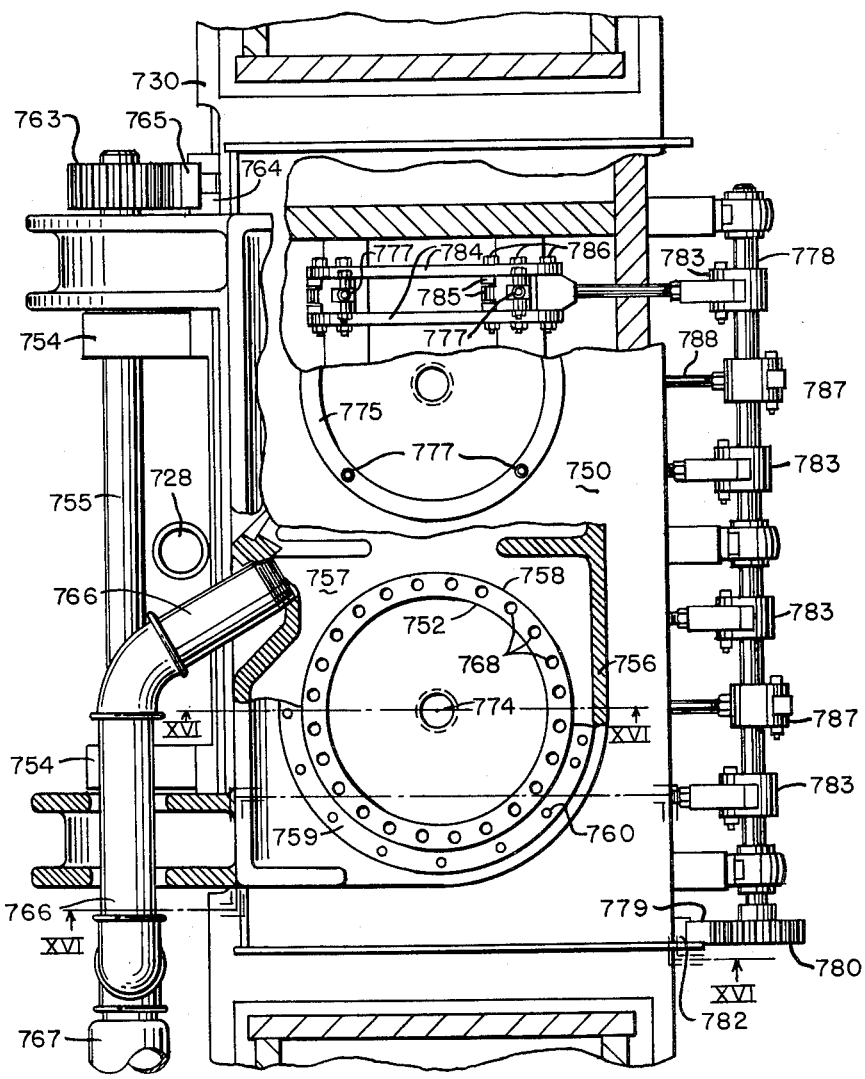
Fig. XV

Jan. 30, 1962 E. G. DE CORIOLIS ETAL 3,019,007
METAL ARTICLE TREATING APPARATUS
Filed May 5, 1958 15 Sheets-Sheet 15
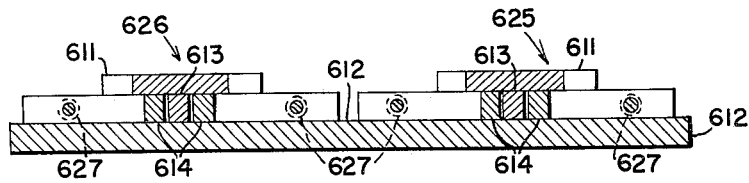
*Fig. XVIII*
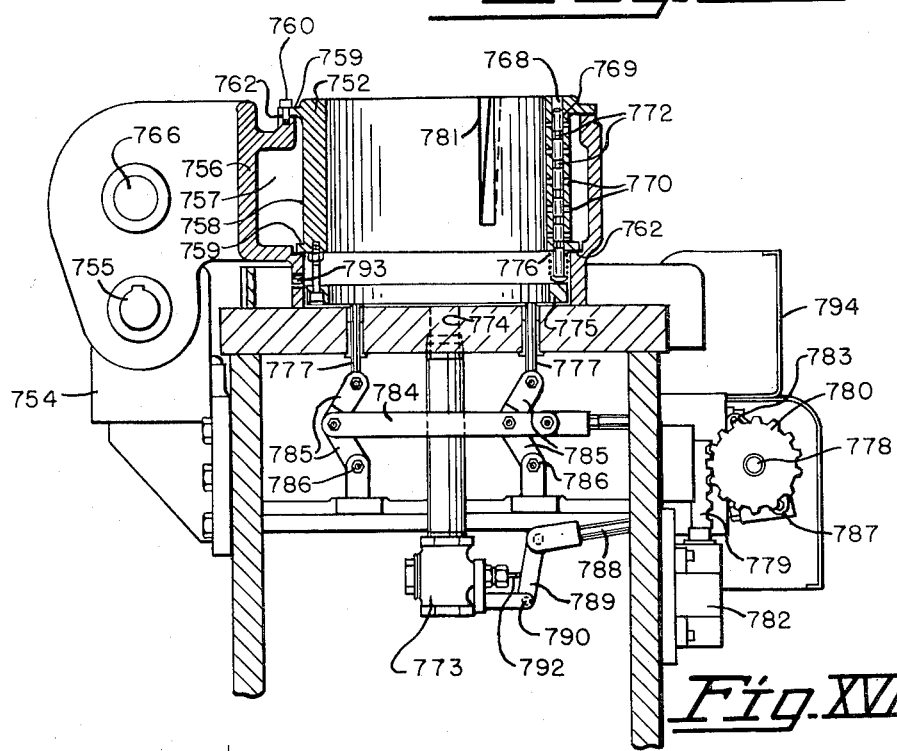
*Fig. XVI*
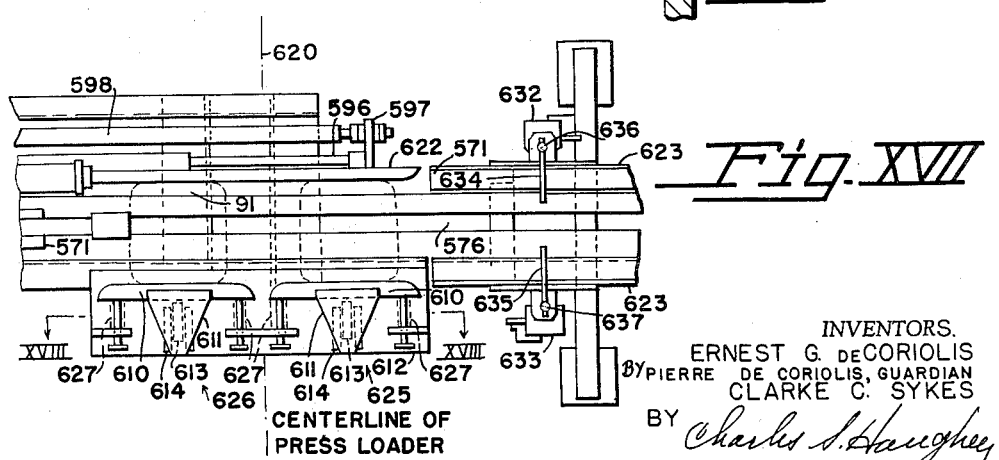
*Fig. XVII*
INVENTORS.
ERNEST G. deCORIOLIS
BY PIERRE DE CORIOLIS, GUARDIAN
CLARKE C. SYKES
BY Charles S. Haughey
ATTORNEY

United States Patent Office

3,019,007
Patented Jan. 30, 1962

3,019,007
METAL ARTICLE TREATING APPARATUS
Ernest G. de Coriolis, incompetent, Toledo, Ohio, by Pierre de Coriolis, guardian, and Clark C. Sykes, Toledo, Ohio, assignors, by mesne assignments, to Midland-Ross Corporation, Cleveland, Ohio, a corporation of Ohio
Filed May 5, 1958, Ser. No. 736,656
20 Claims. (Cl. 266—4)

This invention relates to means for heat treating metal articles and more particularly means for effecting automatically a plurality of heat treating steps involving successive heating and cooling of metal articles.

Heretofore, metal articles have been heat treated in a succession of steps. In such processes wherein the equipment for processing conforms to the shape of the articles, it has been necessary to restrict the processing to a single article form. One example of the heat treating apparatus of this type of which the invention is an improvement comprises that disclosed in Ernest K. Bastress patent application for "Metal Article Treating Apparatus," Serial No. 286,650 which was filed May 5, 1952, and is now Patent 2,822,162 which issued February 4, 1958. In this apparatus annular workpieces of like form are transferred upon inclined rails by rolling them on their periphery through a hardening furnace. Heating of the workpieces effects a desired composition change, usually in their surface regions, by modifying the effects of a preceding carburizing process. Once the workpieces have been heated over the necessary cycle they are automatically transferred to a quench press platen, a quench ring is positioned around them to confine quench fluid to their vicinity, a mandrel is inserted within the open center of the annulus, and then the interior of the ring and the workpiece therein are flooded with quench fluid. The entire surface of the workpiece is flooded essentially instantaneously to avoid the development of undue strains. When cooling has been effected to the desired degree the press is opened and the workpieces are ejected in random fashion to a quench tank to complete the functioning cycle of the apparatus.

The apparatus of the present invention performs a combination of operations which are effected continuously and automatically on workpieces of different configurations which are maintained in a given orientation in accordance with their form throughout the processing. These operations are initiated by the introduction of sets of workpieces into a conveyor system which cooperates with the several pieces of apparatus performing individual heat treating functions, to harden the carburized workpieces by a heat treating process followed by a rapid press quenching and then transfer the quenched workpieces to a low temperature drawing operation.

This apparatus is arranged to accommodate sets of workpieces of different configurations. Simultaneous processing of the cooperating elements of a mechanical unit in this manner insures that those elements will be subjected to the same process as regards furnace temperatures, processing atmosphere compositions, quench fluid temperatures, and similar minor variations in parameters which affect the mechanical properties of the product such as deflection for a given loading and wearing characteristics. In view of the utilization in the process of a press quenching step, the several forms of workpieces comprising each set must be fed to individual press quenching stations adapted to accommodate their particular configurations.

In the embodiment with which this invention is illustrated preliminary processing is effected wherein the combination of workpieces are mounted on a common carrier for conveyance through certain processing steps wherein they require no unique treatment and the processing equipment is adapted to effectively operate on them. Subsequent to this common processing, the elements of like configuration of a work unit are segregated and according to this invention are selectively fed to apparatus exclusively adapted to effect the process steps unique to those workpieces, for example, to individual pairs of press quenching stations suitable for their processing.

Since in the specific example set forth transfer from the hardening heat treating step to the quench station must be effected rapidly, it is advantageous to perform this segregation prior to the heat treating step and feed the pairs of elements as subunits of work to the hardening furnace from which they are subsequently withdrawn. The form of the subunits is monitored as they are withdrawn from the furnace and appropriate press quench loading apparatus is controlled by the monitoring means to transfer the elements to the press quench expeditiously.

The apparatus for effecting a continuous carburizing and hardening process on sets of elements wherein the processing steps are synchronized and the workpieces are press quenched even though partially processed as work units including workpieces of unlike form embodies a number of unique features.

The system as illustrated receives paired workpieces of like form from an automatic loader which transfers them to work support means comprising extensible paired trays or work supports which are coupled together so that their separation can be altered within limits defined by the requirements of the apparatus with which they are associated. The minimum tray separation is utilized in the hardening furnace to maintain the furnace dimensions at a minimum and the maximum separation is employed while the trays are being unloaded and the workpieces transferred to the quench presses so that workpiece spacing corresponds to quench station spacing within the multistation presses. Conveniently a uniform spacing of the paired trays is established on the charge shuttle in positioning the trays for reception of workpieces from the loader. Once the extensible tray portions have been loaded they are pushed into the hardening furnace by the loading shuttle and are released by the loading shuttle so that during the cyclic operation of the furnace the tray is moved away from the shuttle and a new tray which has just previously been unloaded is engaged by the shuttle for utilization in the next tray loading operation.

A rotary hearth hardening furnace has been employed to effect the hardening heat treatment. In this furnace the loaded trays are carried in a plurality of discrete steps through an arc of about 320° from a hearth radius aligned with the furnace charge shuttle to a hearth radius aligned with a furnace discharge shuttle. Each step of the rotary hearth moves a pair of loaded trays from the charge shuttle radius and moves a pair of unloaded trays onto that radius so that they can be withdrawn, loaded, and replaced in the furnace.

Upon completion of the hardening furnace cycle, the loaded extensible trays are engaged by a portion of a discharge shuttle. This discharge shuttle withdraws the trays from the hardening furnace so that the trays separate to a fixed separation which corresponds to the separation of the quench press stations to which the workpieces are to be transferred. While being withdrawn by the discharge shuttle, the workpieces are carried past a sensing station immediately adjacent the hardening furnace exit. At this sensing station controls are actuated to insure that the proper quench press loader is conditioned to receive those elements. This loader then positions the workpieces in proper position for engagement by the mandrels of the quench press stations and actuates the quench press to flood the loaded stations with quenching fluid. When quench pressing has been completed, the press loader removes the workpieces from the press and positions them on the discharge shuttle which at that time has been repositioned to return the emptied trays to the furnace and, after the furnace advances another step, withdraw another charge of workpieces from the hardening furnace. As the second charge of workpieces is withdrawn by the discharge shuttle, the quenched workpieces are advanced to a washing station from which they are removed by a conveyor element and sent through a low temperature draw and final quench and washing steps.

In accordance with the above, one object of this invention is to improve the heat treating of workpieces.

A second object is to effect a rapid transfer of workpieces from a heating station to a quenching station.

A third object is to adjust the separation of workpieces expeditiously in transferring said workpieces from a heating station wherein they are separated by a given amount to quenching stations separated by a different amount.

A fourth object is to sustain a plurality of workpieces with a small separation within a heating apparatus.

A fifth object is to correct the spacing of coupled work support means to appropriate dimensions for apparatus cooperating therewith.

A sixth object is to minimize the manipulations required to load and unload workpieces in a heat treating apparatus.

A seventh object is to utilize a single conveyor to carry heated workpieces from a heating apparatus and quenched workpeices from a quenching apparatus.

An eighth object is to transfer quenched workpieces from a quench station to a conveyor and heated workpieces from said conveyor to said quench station in a single cycle of manipulation.

Another object is to maintain a relationship between jointly processed workpieces of different configurations through individual processing steps uniquely adapted for the individual configurations.

A further object is to manipulate a pair of quench station loaders to alternately load respective quench stations.

Another object is to maintain a loader head for a press in proximity to a workpiece within the press during press operation.

Another object is to insure the advance of workpieces through a processing system. One object subsidiary to this prime object is to bar the return of workpieces to a preceding station from a succeeding station as might occur if an unloading operation malfunctioned on a reciprocating conveyor.

An additional object is to insure the operation of an appropriate apparatus uniquely adapted to process a workpiece form to the exclusion of an apparatus adapted to process a workpiece of another form.

The above and additional objects and features of this invention will be more readily appreciated from the following detailed description when read with reference to the accompanying drawings wherein:

FIG. I is a schematic or block diagram of an overall system with which this invention cooperates showing the pattern of flow of individual workpieces therethrough;

FIG. II is a schematic plan showing the relationship of the turntable and cooperating loader to a more detailed representation of the charging shuttle, and portions of the conveyors in their vicinity;

FIG. III is an isometric of work support means comprising extensible paired trays or work supports which according to this invention can be varied in their separation at critical locations as they support workpieces for conveyance through the apparatus of this invention;

FIG. IV is a side elevation of a charge shuttle of this invention upon which the paired trays are loaded and moved into the hardening furnace in the illustrative system;

FIG. V is a plan view of the charge shuttle with certain details eliminated and others broken away to better illustrate the drive and control mechanisms therefor;

FIG. VI is a side elevation of the discharge shuttle for moving the workpiece loaded, paired trays from the hardening furnace to the quench press loaders, and for moving the quenched workpieces from the quench press loaders;

FIG. VII is a plan view of the discharge shuttle of FIG. VI;

FIG. VIII is an enlarged end view of the discharge shuttle of FIG. VI, showing the load sensing switches for controlling the quench press loaders;

FIG. IX is a schematic diagram in plan, showing the orientation of the hardening furnace, the discharge shuttle, the quench presses, the press loaders, and a following conveyor to additional processing apparatus all according to the illustrative embodiment of this invention;

FIG. X is a partially sectioned elevation of the quench press loaders of this invention;

FIG. XI is an enlarged plan of the rotating mechanism and controls for the press loader of FIG. X taken along line XI—XI thereof;

FIG. XII is an enlarged plan view of the feeder head of the press loader of FIG. X;

FIG. XIII is an enlarged fragment of a sectioned view of the feeder head carriage and its mounting as taken along line XIII—XIII of FIG. XII;

FIG. XIV is a front elevation of a quench press according to this invention;

FIG. XV is an enlarged plan view of the platen of the press of FIG. XIV, quench rings, a quench ring frame, and quench fluid valve actuators, with the several portions broken away to better reveal details of the construction;

FIG. XVI is a sectioned elevation of a quench ring, quench ring frame, and quench fluid valve actuator, taken along the lines XVII—XVII and XVI—XVI of FIG. XV;

FIG. XVII is an enlarged fragmentary portion of the apparatus shown in FIG. VII; and FIG. XVIII is a sectional view taken on line XVIII—XVIII of FIG. XVII.

The system of the present invention for subjecting workpieces to a hardening heat treatment and a press quench can be integrated with a carburizing furnace and a draw furnace whereby workpieces are automatically processed through an entire cycle from carburization to hardening and quenching. Such a combination of elements into an integrated system is disclosed in the application of Ernest G. de Coriolis and Clarke C. Sykes entitled "Heat Treating System," Serial No. 732,517, now abandoned, filed herewith. The integrated system will be described with reference to FIG. I to place the present invention in one typical setting wherein it is employed effectively.

In the exemplary system carburizing and annealing is effected on workpiece sets mounted on rectangular trays which are rectilinearly advanced through processing apparatus. These trays mount four fixtures removably locked thereto upon which are carried workpieces. A pair of frusto conical members having right circular cylindrical openings along their axes and an annular member having a tapered open center constitute a workpiece set in the example. Each tray has two fixtures each mounting a stack of two frusto conical members, hereafter termed cones, and two fixtures each mounting an annular member, hereafter termed a cup, so that two sets of workpieces are processed together. The combination of a tray, fixtures, four cones and two cups will be considered a work unit in the initial portions of the process.

As a file of loaded trays is accumulated on conveyor 53 of FIG. I controls are actuated to cause a first file of five trays to be shifted from the conveyor transversely in a rank of five along the conveyor 54. Conveyor 54 by selecting a rank of five trays positions those trays so that they can be introduced by means of conveyor 55 along the path indicated by the arrows in single file into the vestibule 56 of a carburizing furnace 57. This rank of five trays comprises a single charge for furnace 57. A carburizing furnace 58 corresponding to furnace 57 is positioned adjacent thereto. The next succeeding file of five loaded trays on conveyor 53 is advanced beyond transverse conveyor 54 by master controls (not shown) to a position opposite transverse conveyor 59. Conveyor 59 corresponds to conveyor 54 and advances the file of five loaded trays as a rank to the conveyor 61 arranged to feed them as a file of five to the vestibule 62 of furnace 58. The five loaded trays are then fed from that vestibule into the carburizing furnace 58 as a charge for that furnace and the succeeding file of five trays conveyed from load station 52 on conveyor 53 is fed to vestibule 56 of carburizing furnace 57 so that charges are alternately fed to the adjacent carburizing furnaces 57 and 58 automatically.

Upon completing their traverse of the carburizing furnace 57 or 58 the trays are delivered to an exit chamber for the furnace individually. The exit chamber for furnace 57 is shown at 63. It comprises a hooded compartment which is essentially air tight and which, upon the opening of the furnace door along its side introduces the atmosphere within the furnace to the chamber so that the tray ejected from the furnace into the chamber is maintained in an atmosphere which does not alter its condition appreciably. The lower portion of the chamber 63 is open. The tray comes to rest within the chamber on an elevator which is capable of descending through the bottom of the chamber. In order to maintain the seal of the exit chamber, the lower periphery of its hood is in registry with a quench tank 60 and positioned below the surface of the quench liquid therein. Thus, the work unit is maintained in a favorable atmosphere until subjected to quenching by being immersed in the quench liquid.

While immersed in the quench tank 60 the work unit is transferred laterally of the elevator station so that it is no longer beneath the open bottom of the exit chamber 63 but instead is in a transfer station 64. The elevator within the quench tank has a platform section which raises the now quenched work unit to admit that work unit to a conveyor 65 and position itself for the reception of another work unit from the furnace 57. The quenched work unit is next carried by means of conveyor 65 through a wash station 66 and thence to a transverse conveyor 67.

A furnace exit chamber 68, transfer station 69 and quench tank 70 integral therewith, corresponding to chamber 63, station 64 and tank 60, are provided for carburizing furnace 58. Similarly, a conveyor 71 of the type of conveyor 65 carries the quenched work units from transfer station 69 through a wash station 72 to conveyor 67.

Conveyor 67 is fed work units from both sides which it delivers one at a time to conveyor 80. When five units have been accumulated therein, it advances those five units in rank over conveyor 80 to conveyor 73. Conveyor 73 functions much in the manner of conveyors 55 and 61 in advancing the entire rank of work units in single file into a vestibule 74 of a draw furnace 75 wherein the rank of work units are advanced down the length of the draw furnace. Upon completion of their transit of furnace 75, the work units are individually withdrawn from the furnace through an exit chamber 76, corresponding to exit chamber 63 and 68, in which they are quenched and transferred to station 77 and thence through a washer 78 by conveyor 79.

In normal operation work units are carried by conveyor 79 to transfer station 81 and thence by way of conveyor 82 to loading station 83 for the rotary hearth hardening furnace 84. At loading station 83, cups and cones are lifted free from their respective cup fixtures and cone fixtures and the unloaded tray and fixtures are transferred to a return conveyor 85 which carries the trays back to loading station 52.

When the carburized, quenched, and drawn workpieces are withdrawn from washer 78, they have reached an intermediate stage in their processing wherein their characteristics are stable and therefore their processing can be interrupted for a substantial interval if necessary. At this time, a substantial number of workpiece manipulations and processes which are of a critical nature timewise remained to be performed on the workpieces. Conditions can arise wherein the rate of issue of work units from conveyors 79 to load station 81 exceeds the rate at which those work units can be processed through loading station 83. Such conditions may be created by a carburizing and drawing process which prepares the units for hardening and press quenching operations at a faster rate then those hardening and press quenching operations can be performed. Such conditions might also arise where the processing units beyond the loading station are required to be shutdown while work units are issuing from the carburizing and draw furnace. Surges of work units at transfer station 81 are absorbed without causing those units to back up in either the draw or carburizing furnaces by by-passing conveyor 82 and loading station 83. This by-passing is performed by a by-pass pusher 86 which is integrated with conveyor 79 and is actuated when a work unit is positioned at transfer station 81 and loading station 83 is unable to accommodate that unit. When actuated, pusher 86 advances the work unit from transfer station 81 along the axis of conveyor 79 and across conveyor 82 so that it is placed on return conveyor 85 at surge station 87. Once a loaded work unit is placed in the return conveyor, it is carried along that conveyor and is stored thereon so that attendants can remove the work units therefrom prior to their return to loading station 52 and insert them in the hardening furnace loading station 83 at such time that the equipment following the hardening furnace can accept and process those work units.

Upon introduction of a work unit into loading station 83, it is indexed on a turntable 88 and is turned so that a diagonal is parallel to the feeding axis of hardening furnace loading shuttle 92. A loader 89 superjacent the turntable 88 is arranged to pick up pairs of cups and transfers those cups to work support means comprising a plurality of extensible paired trays or work supports 91 positioned on the hardening furnace loading shuttle 92. Loading shuttle 92 advances paired work supports 91 into the hardening furnace and positions them on a station of hardening furnace rotary hearth 93. The rotary hearth carries the paired work supports free of the loading shuttle and ultimately through about three hundred and twenty degrees of rotation to an unloading station where a pair of paired work supports is engaged by hardening furnace unloading shuttle 94. As the rotary hearth rotates, it carries a pair of empty paired work supports, which have been maniplated out of the furnace to an unloader by shuttle 94 and returned to the furnace empty during the interval the loaded paired work supports have been inserted by the shuttle 92, to a position enabling those paired work supports to be engaged by the loading shuttle 92. Thus when shuttle 92 is withdrawn from the furnace it withdraws a pair of empty extensible paired work supports and positions those paired work supports appropriately with respect to the loader 89.

Subsequent to the removal of the first pair of work units from the carburizing tray the turntable 88 is again indexed to reposition the tray in a manner such that another pair of fixture mounted workpieces are positioned for engagement by the loader 89. These workpieces may be pairs of coaxially stacked cones which are picked up by lifting magnets of the loader, are advanced to be positioned above the extensible trays brought into loading position by the shuttle 92, and are deposited on the paired work supports 91. The reloaded extensible paired work supports 91 are then inserted into the furnace. As the hardening furnace rotary hearth 93 is advanced through one step, the reloaded paired work supports are picked up by that rotary hearth, and are carried through a hardening heating cycle.

The two hardening work supports are collapsed upon each other when inserted in the hardening furnace to maintain the workpieces thereon in as compact an arrangement as is possible and thereby limit the dimensions required in the hardening furnace. The work supports are extended so that they are separated by a fixed distance when they are withdrawn by the shuttle 94, that distance being the workpiece separation corresponding to the separation of pairs of press quenching stations in quench presses 95 and 96. Thus, these work supports enable the optimum workpiece separations to be established at a loading station, in the hardening furnace, and at the unloading station from which they are fed to the quench presses.

Distortion of workpieces is prevented by press quenching wherein the workpiece configuration of the cups and cones is constrained by mandrels or dies which fit into the open centers of those elements and have outer dimensions which correspond to the desired inner dimensions of the elements. Since the cups have a substantially greater inner diameter than do the cones, separate quenching stations must be provided for these workpieces. In loading the extensible hardening furnace paired work supports, the workpieces are positioned thereon in pairs such that a pair of cups are positioned on one pair of hardening furnace work supports and a set of four cones are positioned on the other pair of hardening furnace work supports. When the work supports are withdrawn from the furnace, each work support load is transferred to quench press station by a quench press loader 97 or 98. When a work support bearing a pair of cups is withdrawn from the hardening furnace 84, a monitoring unit adjacent the furnace exit senses the load of cups and controls loader 97 so that it can function to pick up the cups and transfer them to the cup quenching stations in quench press 95. While the cups are being press quenched, the shuttle 94 advances into the furnace again to return the emptied extensible paired work supports 91 and to pick up the next succeeding pair of paired work supports of workpieces brought into registry with the exit path by the furnace hearth 93. This next pair of paired work supports contains a load of cones. When it is withdrawn from the furnace, the monitoring device senses the presence of the cones and permits the loader 98 to pick up those cones from the shuttle and transfer them to the press quenching stations for cones in quench press 96.

Loader 97 removes the cups from quench press 95 when the cups therein have been press quenched and places those cups on shuttle 94. The operation of the quench press, the loader, the shuttle and the hardening furnace 84 are all synchronized so that press quenching is completed while the shuttle is returned to furnace 84 to pick up the next succeeding pair of paired work supports. At that time the loader transfers the press quenched workpieces to the shuttle 94 before it is withdrawn from the hardening furnace. Shuttle 94, therefore, is provided with a work carrier 99 on the end opposite that engaging the hardening furnace work supports. When the work carrier 99 is loaded, the shuttle operates to advance the workpieces thereon to magnetic loader 101 which picks them up and transfers them to a conveyor 102 made up of a hydraulic pusher and conveyor belts. Thus, press quenched workpieces are transferred to a following conveyor while heated workpieces are positioned for introduction into the quench presses by a single reciprocating motion of the shuttle 94. Further, the loader which placed the quenched workpieces on carrier 99 remains positioned for the reception from shuttle 94 of heated workpieces since the alternate loads of cups and cones in furnace 84 insures that the load withdrawn from the furnace is of the same nature as the load advanced to unloader 101.

Once the workpieces are appropriately positioned on the conveyor belts of conveyor 102, they are washed, rinsed and advanced through a low temperature draw furnace 103 so that they are reheated and then delivered from the furnace 103 in condition for final processing.

In considering the detailed operation of the system and the elements of which it is constituted, assume that twenty-five sets of workpieces are to be produced an hour. Since two sets are processed in each work unit a work unit rate of twelve and one half per hour or one every 4.8 minutes is required and a loaded tray issues from one of the carburizing furnaces 57 and 58 every 9.6 minutes. All of the functions to be described can be operated manually or by means of a timer such as a motor driven cam actuating switch in sequence. Further, interlocks are provided to insure against malfunctions of the system when a succeeding stage is unprepared to receive a work unit.

FIG. II shows the region adjacent the charge shuttle 92 including a portion of the conveyor 82 for the work units, the empty tray return conveyor 85, a phantomed outline of the turntable deck 381 and a phantomed outline of the workpiece loader 89 for transferring workpieces from a loaded tray on deck 381 to the loading position on charge shuttle 92 as represented by the phantomed circles thereon. A number of adjuncts to this equipment are also depicted in FIG. II.

As work units are advanced along conveyor 85 they are carried onto deck 381 of the turntable by a pusher arm (not shown) which sweeps past the deck 381 in the indentation 382 of the deck periphery and which actuates a limit switch 371 to initiate its return to the rear of conveyor 82. The presence of the work unit on deck 381 is sensed by a limit switch 389 mounted on bracket 391. This switch is actuated by a gate 383 comprising a portion of the deck which is hinged at 385 and has a free end 384 raised slightly above the deck when no tray is present. An extension 388 from gate 383 actuates switch 389 when depressed to initiate an indexing and unloading cycle for the turntable and unloader 89.

Unloader 89 is supported above the turntable and charge shuttle 92 on legs 453, 454, 455 and 456. It has paired pickup heads (not shown) which are aligned parallel with the loading axis of shuttle 92 and can be moved from above turntable deck 381 to above shuttle 92 by a carriage (not shown). In the exemplary arrangement the pickup heads transfer a pair of cups to the shuttle 92 when a loaded carburizing tray is first introduced to the deck 381 and thereafter transfer two pairs of stacked cones to the shuttle 92.

When the carburizing tray is unloaded it is transferred from deck 381 by a pushoff comprising a reciprocating beam 372 from which extends a pusher arm 372a. The presence of the beam 372 in its retracted position is sensed by limit switch 374 to actuate controls which are not shown.

An advanced and emptied tray when located on the rear of conveyor 85 actuates limit switch 373 in the control circuits for that conveyor so that its pusher head (not shown) advances from the back of the conveyor with the tray and actuates limit switch 377.

Thus loaded carburizing trays are brought to a position adjacent charge shuttle 92, are unloaded onto two paired hardening trays successively positioned in the loading stations on that shuttle, and then are transferred from the vicinity in order to permit subsequent loaded carburizing trays to be unloaded.

The furnace 84 in which the carburized workpieces are heat treated to effect their hardening includes a rotary hearth 93 wherein the workpieces of like form are paired on radii of the hearth and carried from a loading station associated with the shuttle loader 92 at which they are introduced to an unloading station where they are withdrawn by shuttle 94. It is desirable that the pairs of workpieces be held in the furnace in as compact an arrangement as possible in order to limit the furnace volume required to a minimum. Subsequent to the heating step the workpieces must be separated rapidly to enable them to be transferred with appropriate spacing to quench presses. These critical workpieces spacings and the efficient transfer are realized by the use of hardening furnace work support means comprising the coupled or paired work supports or trays 91 as shown in an isometric view in FIG. III.

The paired work supports 91 are illustrated at their maximum extension. They each comprise an open latticework deck 501 surrounded by a frame 502. The paired work supports are coupled by means of rods 503 arranged to slide in apertures 504 in the sides of frames 502 in proximity to each other and through the similar apertures 505 in the slats 506 forming a portion of the deck 501. When collapsed the rods 503 telescope into the interstices of the latticework deck 501 from each of the work supports so that the adjacent faces of the frames 502 of respective work supports are in abutting relationship. When extended the work support separation is defined by collars 507 secured to rods 503 and engaging the side walls 506. When subjected to a sliding motion, these work support pairs are moved along an axis paralleling rods 503 by the engagement of a shuttle hook with a work support hook 508 extending from the outermost face of each work support frame to a position below the major undersurface of the work support. Each work support deck is arranged to mount a workpiece fixture corresponding to the fixtures employed on the carburizing tray. Thus, a pair of hardening furnace work supports 91 for the transfer of cups each mount a cup fixture by reception of the lower extremities of a fixture spindle which is perpendicular to deck 501 in a central aperture 509 in the work support deck defined by the ends of lugs 510 projecting from the sides of slats 511 defining the central square in the deck. Similarly cone fixtures are mounted with a lower projecting portion of their spindles in central apertures 509 of the trays 91 arranged for the reception of cones. Each fixture is locked to its work support 91 by a bayonet coupling including a bayonet engaging the undersurface of a lug 510 and is maintained in locked position by detents 500 embracing one of a plurality of legs extending from the spindles of the fixture to form a spider supporting it on deck 501.

In setting up the radial hearth 93 of furnace 84, paired work supports on successive radii of the hearth are alternately provided with cup fixtures and cone fixtures and are synchronized with the loading operations of the magnetic loader so that a pair of paired work supports conditioned for cup reception are positioned beneath the loader when cups are to be loaded and a pair of paired work supports with cone fixtures are on the charge shuttle when cones are being transferred.

A side elevation showing details of the hardening furnace loading shuttle 92 appears in FIG. IV while a fragmentary plan of that shuttle is shown in FIG. II. That shuttle comprises a table having an upper face 512 made up of a pair of parallel strips as seen in FIG. V which run the length of the shuttle and are separated by an open center portion 513. Strips 512 and the remainder of shuttle 92 are supported on appropriately spaced legs 514 so that the table surface is level with the hearth line (not shown) of radial hearth furnace 84. Beneath the strips 512 constituting the table top are mounted a series of longitudinally extending angle iron members supporting the various operating elements of the shuttle. The first of these members 515 supports a downwardly projecting rail 516 which is complemented by a lower rail 517 mounted on member 518 to sustain and guide flanged wheels 519 of shuttle carriage 520. Movement is imparted to carriage 520 along rails 516 and 517 by means of a hydraulic cylinder 521 to advance and retract a pusher arm 522 secured to the carriage and supporting on its forward end a hook 523 including a leading finger 524 and a trailing pusher face 525. Hydraulic cylinder 521 is coupled to carriage 520 by means of a chain 526 through a rack 527 and a pinion 528 engaged thereby and mounted on shaft 529 which also mounts a driving sprocket 530 for chain 526. Rack 527 is reciprocated by cylinder 521, as best seen in FIG. V through the linkage from the piston rods 531 and 532 extending from opposite ends of the cylinder through end brackets 533 and 534 to a rod 535 upon which the rack is mounted. Rod 535 also mounts a pair of camming elements 536 and 537 which actuate deceleration valves 538 and 539 at appropriate positions approaching the limits of travel of the pistons within the cylinder 521.

The chain driven from sprocket 530 is trained over sprockets 540 and 541 to insure that it engages the driving sprocket over a substantial portion of its periphery and thence to end sprockets 542 and 543 from which it extends horizontally to the opposite ends of the carriage 520 to which it is connected by means of suitable couplings to lugs 544 and 545 depending from that carriage. In order to insure a proper driving relationship through the medium of chain 526, a chain tightener 547 provided with an idler sprocket 548 is mounted for rotation at the end of arm 549 on pivot 550 and can be adjusted with respect to the chain. A spring loaded bumper 551 is provided at the end of travel of rod 535 to cause a limited retraction of the pusher arm 522 when hydraulic pressure is relieved, as will be described.

The longitudinal center of the table 512 and the coinciding axis along which pusher arm 522 reciprocates are on the extension of the radius from the rotary hearth within the furnace 84. The walls 552 of that furnace are provided with an aperture 553 of dimensions suitable to admit the pusher arm 522 and a loaded pair of paired hardening furnace work supports 91. This furnace opening is provided with a door 554 shown in phantom in FIG. IV which can be closed while pusher arm 522, as also shown in phantom, is extending within the furnace. The rotation of the furnace hearth, the operation of the furnace door 554, and the reciprocating motion of pusher arm 522 are all synchronized with the other operations within this heat treating system to effect the continuous processing of the workpieces therein.

Four primary functions are performed by the loading shuttle 92 in synchronism with the associated elements of the system. Following the loading of a pair of paired hardening furnace work supports 91 positioned on table top 512 beneath the magnetic loaders, those work supports are fed along the table top and into the furnace by the loader and when positioned on the rotary hearth in the location from which they were removed as empty trays they are released so that the hearth is free to rotate and carry the paired work supports to a new position. Following the release of the paired work supports, an empty pair of paired work supports are engaged with the hook 523 of pusher arm 522 incidental to the rotation of the rotary hearth. These paired work supports are withdrawn from the furnace by the shuttle 92 and incidental to their withdrawal they are pulled apart to their maximum extension. Once they are free from the furnace, the furnace door 554 which was opened to permit them to be withdrawn is reclosed and the paired work supports are collapsed upon each other to position them properly in the loading station beneath the magnetic loader for loading as described previously.

Control of the above functions of the shuttle and the synchronization of these functions with the operations of the associated furnace and magnetic loader is effected in an electro-hydraulic control, not shown, which is responsive to several limit switches illustrated in FIG. V. Limit switch cams 555, 556 and 557 are positioned on the upper surface of carriage 520 and are arranged to engage followers of the several limit switches located below the upper surface 512 of the loading shuttle table. At the time that a pair of paired hardening furnace work supports 91 have been loaded with workpieces by the magnetic loader, the hook 523 is in the position shown in phantom at 523' in FIG. IV. The completion of the operation of magnetic loader initiates the feeding operation of shuttle 92 by first opening furnace door 554 and then causing pusher arm 522 to advance from the position of loading to a point positioning hook 523 at the location 523'' as shown in FIG. IV wherein the paired work supports are located on the rotary hearth in the position from which they were withdrawn initially. When the pusher arm 522 has been advanced to its maximum extent within the furnace as indicated at 523'', cam 555 actuates limit switch 558 to terminate the advancing motion of the carriage which was initially decelerated by the operation of deceleration valve 539 when engaged by cam surface 537. Incidental to the completion of the advance of paired work supports 91 into furnace 84, the furnace door 554 is closed. In this position the pushing face 525 of pusher arm hook 523 abuts the rear face 559 of tray hook 508. When the furnace is rotated, it is necessary for the work support 508 to disengage the pusher arm hook 523 by moving transversely of that hook. However, the side flanges 560 of hook 508 prevent such movement when the pusher arm is in its most advance position abutting face 525 against hook face 559. Accordingly, the pusher arm is retracted sufficiently to disengage the hooks by positioning the hook 508 within the open center portion of hook 523 between pusher face 525 and the hook finger 524. Spring biased bumper 551 effects this retraction. At the maximum extension of pusher arm 522 the rack support rod 535 engages and displaces bumper 551 toward the rear of the conveyor. This displacement is maintained while driving pressure is imposed on the hydraulic fluid on the advance side of piston 521. When that pressure is relieved the spring of bumper 551 displaces rod 535 toward the front of the conveyor until it balances the load imposed by the rod thereby retracting the pusher arm 522 sufficiently to free tray hook 508 from pusher hook 523. When the hooks 523 and 508 have been disengaged the hearth is caused to rotate thereby advancing a pair of paired hardening furnace work supports 91 which have previously been unloaded by shuttle 94 as will be described in detail to a position where there hook 508 is within the open portion of hook 523. Upon completion of the stepping of the rotary hearth the furnace door 554 is opened and a pair of empty paired hardening furnace work supports is withdrawn from the furnace by the retraction of carriage 520 to the end of table 512.

Cam 557 actuates limit switch 562 to terminate the reversing motion which was decelerated by means of decelerating valve 538 responsive to actuation by cam 536. At this time the furnace door 554 is closed and the shuttle carriage collapses the extended paired work supports upon each other and advances them into the loading station for the magnetic loader by advancing carriage 520 until its cam 556 actuates limit switch 563. Operation of limit switch 563 terminates the advancing motion of carriage 520 and initiates a loading operation by the magnetic loader. When loading by that loader is completed, the furnace door is reopened and the carriage again is advanced to insert the paired work supports 91 into the furnace through another cycle as described. Thus, the charge shuttle 92 performs two cycles for each carburizing tray load handled by the magnetic loader.

Limit switch 561 provides a safety function in that it stops the operation of the shuttles, loader and hardening furnace if the shuttle carriage is retracted without withdrawing a tray from the furnace. Thus, a tray having a broken hook will not be recycled. This switch is actuated by a pivoted arm 561a provided with a sensing element above the table 512 and in the tray path so that it is displaced by a tray moving along the table.

Work support collapse is effected by operation of a work support collapse cylinder 564. This cylinder is coupled to the frame of table 512 above the path of carriage 520. A piston rod 565 extends from the cylinder 564 to abut an adjustable stud 566 mounted in a tapped hole in a lug 567 on carriage 520. Thus, when the carriage is advanced, it is free of rod 565 and can separate therefrom and when it is retracted stud 566 is brought against the end of rod 565 so that the admission of hydraulic fluid to cylinder 564 advances the rod 565 and thereby advances stud 566 to drive the carriage to the tray collapse position wherein the tray hook is at the phantomed position 523' in FIG. IV.

When the paired work supports are withdrawn from the furnace, they separate. The application of an inward force on the outermost work support tends to collapse them. Tray collapse and proper positioning in the loading station is assured by means of a work support positioner, best seen in FIG. II. This positioner comprises a stationary shoe 568 positioned adjacent the work support path on charge shuttle table 512 and a pair of spring biased shoes 569 on the opposite side of the work support path spaced so that they engage and frictionally retard the movement of the work supports along the table. Thus the innermost work support 91 is withdrawn sufficiently to bring it into its loading station when the paired work supports are extended. Since that work support is retarded by engagement of its sides by shoes 568 and 569 the inward advance of the outermost work support 91 causes that work support to be brought into abutting relationship to the inner work support and to be held in position by its shoes 568 and 569.

Discharge shuttle 94 for rotary hearth furnace 83 is positioned with its longitudinal axis coinciding with a furnace radius immediately preceding the radius on which the load shuttle 92 is oriented so that the loaded hardening furnace work supports are stepped around the hearth as the loading shuttle effects its loading cycles and are ultimately brought to the radial position coinciding with the discharge shuttle axis. The discharge shuttle withdraws the work supports from the hardening furnace after they have proceeded through the cycle and positions them so that they can be unloaded during the interval that empty trays are withdrawn and loaded while on shuttle 92.

Discharge shuttle 94 is shown in a side elevation in FIG. VI, in plan in FIG. VII and in end view in FIG. VIII. It corresponds to charge shuttle 92 in some respects in that it includes a table 570 made up of a spaced pair of flat-topped side rails 571 and has a pusher arm 572 terminating at its furnace end in a hook 573 having a pushing face 574 and a finger 575. The pusher arm 572 and hook 573 are arranged for reciprocation along the longitudinal axis of the table 570 in an open center portion 576 between the side rails of the table top. Pusher arm 572 in turn is mounted on a carriage 577 made up of a pair of channels 578 secured to a flat bar 579 as best seen in the end view of FIG. VIII. A bar-like bearing surface 580 is mounted on the undersurface of the upper flange of each of the channels 578 to provide the surface on which rollers 582 ride. Rollers 582 are mounted for rotation on suitable cantilever axles 583 in the stationary longitudinal side members 584 depending from the table top side rails 571.

Carriage 577 performs two transfer operations in this system. In addition to withdrawing loaded hardening furnace work supports from the rotary hearth furnace, positioning them for the removal of the workpieces by press loaders 97 and 98, to be described, and thereafter returning the unloaded hardening furnace work supports to the furnace 83, carriage 577 also transfers the press quenched workpieces received from the press loaders to a following workpiece conveyor 102 in the system. This transfer of quenched workpieces is accomplished by means of workpiece carriers 585 on the end of carriage 577 which is most remote from furnace 84. Work carriers 585 are universally adaptable to sustain individual cups or pairs of cones during the reciprocating motion of the carriage 577. They each comprise a central cylindrical portion 586 providing a spindle which is embraced by the workpieces having the smaller inner diameter (the cones) and radial arms 587 extending therefrom to form a supporting deck for the end of workpieces and terminating in upturned fingers 588 which prevent the displacement of the workpieces having the larger outer diameter (the cups) beyond the ends of those fingers. Each workpiece holder 585 is mounted on a plate 589 secured to the upper flanges of the channels 578.

Motion is imparted to carriage 577 by a hydraulically actuated pinion 590 engaging a rack 592 secured to the undersurface of carriage plate 579. Rotation of pinion 590 is effected through its shaft 593 which is coupled to a smaller pinion 594 at one side of the shuttle 94. Pinion 594 is engaged by a rack 595 mounted on a rod 596. Rod 596 is coupled through bracket 597 to piston rod 598 and through bracket 599 to piston rod 600. Each of piston rods 598 and 600 are coupled to a piston with a hydraulic cylinder 602 whereby the feed of hydraulic fluid to one end of the piston drives the rod 596 and thus the rack 595 in one direction parallel to the longitudinal axis of discharge shuttle 94 while the admission of fluid to the outer end of the piston drives the rack in the opposite direction. The reciprocating motion of rod 596 is facilitated by supporting rollers 603. As in the case of load shuttle 92 the rod 596 moving in synchronism with the piston within the cylinder 602 is provided with cams 604 and 605 adjacent its ends whereby hydraulic decelerating valves 606 and 607 are actuated to slow the motion of the reciprocating drive near the ends of its travel.

Control of the reciprocating motion of carriage 577 is afforded by the master electro-hydraulic control system which is not shown and which is responsive to several limit switches mounted at appropriate positions on the supporting structure for shuttle 94.

A cup quench press loader 97 and a cone quench press loader 98 are positioned on opposite sides of discharge shuttle 94 so that their pickup mechanisms are centered on line 620 as shown in FIG. VII. A work support positioner similar to that shown in FIG. II, is provided at this station to insure the proper orientation of hardening furnace work supports 91 in their extended position as they are withdrawn from furnace 84. The positioner comprises a fixed shoe 622 extending inward from the outer limits of the side rails 571 and above those rails whereby the work supports are centered on the rails 571 after being confined to the table by upstanding side flanges 623 intermediate the furnace door 624 and the tray positioner. Separate shoes 625 and 626 are provided on the opposite side of the shuttle table in cooperative relationship with shoe 622 to individually engage the extended trays at the maximum spacing of their centers. This separates the workpieces to proper centers for accommodation in the quench presses and the press feeders. Shoes 625 and 626 are mounted for transverse displacement and comprise tray engaging guides 610 which are held biased against trays 91 by the action of springs 627. Tray engaging guides 610 are maintained parallel to fixed shoe 622 by guide plate 611 rigidly attached to guides 610 and having a slide bar 613 attached to the under side of plate 611 perpendicular to tray guides 610 and riding in adjacent slide guides 614 affixed to plate 612 which is, in turn, attached to table 570. This engagement of the work support 91 which is innermost in the furnace offers sufficient resistance to its introduction into the positioner to insure that the work supports are extended to their limits at the termination of shuttle retraction.

In FIGS. VI and VII the shuttle carriage is shown withdrawn or in its "out" position with work holders 585 at the transfer station for loader 101 and hook 573 positioning work supports 91 (represented in dotted outline) in the work support positioner 621. However, it is convenient to consider an operating cycle as initiating with the shuttle carriage advanced or in its "in" position with hook 573 in position 573′ shown in phantom in FIG. VI.

When the shuttle is in the furnace, hook 573 is positioned to straddle the path of work support hooks 508 as the work supports are rotated by the rotary hearth. As a work support is indexed to its discharged position, hook 573 is aligned to engage hook 508 when the shuttle is retracted. In the synchronized operation of the system a press feeder for a pair of workpieces is positioned over the shuttle 94 at work support positioner 621 to pickup hot parts as they are withdrawn, having just deposited quenched parts of that type on the work holders 585 which are located within the work support positioner. As the door of furnace 84 for the charge shuttle 92 is closed following the introduction of a loaded pair of hardening furnace work supports 91 by that shuttle, the discharge shuttle door 624 is opened and retraction of carriage 577 is initiated. Since work support retraction begins before the door 624 is fully open, a safety interlock is provided to prevent the contact of the door by the work supports. This interlock is afforded in a control (not shown) which prevents the motion of carriage 580 beyond a position short of the door if limit switch 628 of FIG. VI, actuated from a cam (not shown) appropriately positioned on reciprocating rod 596 in the drive linkage for carriage 577, is operated while the door is short of its fully open position as sensed by conventional means such as another limit switch (not shown). In normal operation door 624 is fully open prior to the operation of limit switch 628 and the shuttle carriage 577 continues toward its fully retracted position until decelerating valve 606 is operated by cam 604 on rod 596. At the fully out position limit switch 630 is actuated by a cam on rod 596 to close furnace door 624, to start the unloading operations of the work holders 585 by unloader 101, and to start unloading of the work supports 91 by press loader 97 or 98.

Since the work must conform to the quenching fixtures in the quench presses 95 or 96 an interlock is provided to stop the press feeders and prevent further operation of the shuttle if the operation is out of phase whereby the workpieces withdrawn from the furnace 84 are of a type which should not be picked up by the feeder 97 or 98 positioned to unload the trays. This interlock is provided by limit switches 632 and 633 having feeler rods 634 and 635 mounted on rotatable shafts 636 and 637, respectively, to actuate the switches when the feeler rods encounter a workpiece of the type they are adjusted to sense and are displaced to rotate their respective shafts. For example, in FIG. VIII workpieces are shown in phantom lines in the form of cones 35. As these cones pass feeler rods 634 and 635, feeler rod 635 will come into contact with the cones to actuate limit switch 633 while feeler rod 634 will not make any contact. Similarly, if the workpieces were cups, feeler rod 634 would come into contact with the cups to actuate limit switch 632, but feeler rod 635 would not make any contact. When hot parts are discharged from the furnace, they actuate the appropriate limit switch to enable operation of the feeder positioned to receive the work. If the wrong type of parts come from the furnace or if no parts pass the limit switches to actuate one or both of the switches, the discharge shuttle is stopped in its "out" position, the door 624 is closed, and an alarm is operated (all by means not shown) to avoid faulty operation and damage to work or machines. The absence of parts at this point in the process might result from their loss from the trays within furnace 84 or might indicate an absence of a tray as could result from a broken hook on the trays or on the discharge shuttle.

When unloading operations have proceeded to a point where the workpieces have cleared work holders 585 and the work supports 91 (by control means not shown), the discharge shuttle door 624 is opened and the shuttle carriage 577 is advanced toward the furnace. This collapses the emptied work supports 91 and inserts them in the furnace while repositioning work holders 585 for the reception of quenched workpieces from the loader opposed to that loader which has just previously transferred the hot workpieces to its press. As the work holders 585 are withdrawn from loader 101, they are monitored by a limit switch 638. If the switch is not actuated, the cycle is permitted to continue. If a workpiece remains on one of the holders 585 it engages feeler arm 639 mounted on rotatable shaft 640 and causes that arm and shaft to rotate and actuate switch 638. Similarly if the feeder fails to remove all work from the work supports 91 feeler limit switch 632 or 633 is operated. In either instance the shuttle is caused to retract to its "out" position, door 624 is closed, and an alarm is operated (all by controls not shown) to indicate the malfunction.

If none of limit switches 632, 633 or 638 is operated, when the shuttle carriage 577 is fully advanced, limit switch 642 is operated by the cam on rod 596 which operated limit switch 630 when the carriage was fully retracted. Upon operation of limit switch 642 door 624 is closed. Completion of the closure of door 624 operates controls which relieve the hydraulic pressure in cylinder 602 tending to force carriage 577 into the furnace. At the maximum extension of carriage 577, bracket 599 on the end of piston rod 600 engages and displaces spring biased bumper 643. When the hydraulic pressure in cylinder 602 is relieved, the bumper 643 returns the rod 600 from its position of maximum extension to a point which withdraws hook 573 sufficiently so that it again straddles the path of work support hooks 508 to release the hook 508 of the empty work support just returned to the furnace. The hearth then advances another step to index a loaded work support so that its hook 508 is within hook 573 and the cycle is repeated.

In a system arranged to convey a carburizing tray from the draw furnace 75 to the turntable 88 every 4.8 minutes, a hardening furnace work support loading cycle and an unloading cycle as described is performed every 2.4 minutes.

Transfer of the workpieces from the hardening furnace work supports 91 on shuttle 94 to the quench presses to the work holders 585 is performed by feeders 97 and 98. These feeders are of like construction with the exception of the pickup fingers which are chosen to accommodate the elements to be handled by the individual feeders. A typical feeder is shown in elevation in FIG. X and the relationships between the rotary hearth furnace 84, the discharge shuttle 94, the feeders 97 and 98, the quench presses 95 and 96 and the magnetic loader 101 are shown in FIG. IX.

Each pair of work support borne workpieces withdrawn from furnace 84 by the engagement of hooks 508 and 573 and the retraction of pusher arm 572 is positioned for unloading with the pair of trays 91 having a separation defined by the length of tray coupling rods 503. The separation of work supports 91 at the unloading station corresponds to the separation of the paired workpiece stations 645 in cup quench press 95 and the like separation of cone stations 646 in quench press 96. Each press feeder has a pickup head including a pair of pickup finger arrays. This head is arranged for rotation about a vertical axis located at the intersection of lines perpendicular to a bisecting line between the centers of the two work support positioners on shuttle 94 and between the centers of the quenching stations in the respective quench presses. Thus cup press feeder 97 has a pickup head 647 rotatable around axis 648 and a cone press feeder 98 has a pickup head 649 arranged for rotation about a vertical axis 650. In order to afford the required manipulations, feeders 97 and 98 are each arranged to rotate about their axes 648 and 650, to reciprocate along those axes from a depressed to an elevated position, and to reciprocate pickup heads 647 and 649 longitudinally in a horizontal plane normal to axes 648 and 650. In the depressed position the feeders either pickup or deposit workpieces while in the elevated position they clear the workpieces of their several mountings whereby relative movement can be effective therebetween.

Cup feeder 97 is positioned as shown in FIG. IX after it returns quenched cups from press 95 to the workpiece holders 585 on shuttle 94. Once the cups have been released by the pickup head 647 it is elevated so that the shuttle 94 is free to reciprocate and carry the quenched workpieces to magnetic loader 101 and to carry heated cups from the furnace to a position below head 647. At that time, head 647 is depressed to permit the cups to be picked up. It is then elevated to lift the cups free of their mounting fixtures on trays 91, is retracted toward axis 648, is rotated clockwise 90 degrees about axis 648, and is advanced toward cup stations 645 in press 95. When the cups are located above their stations 645 by head 647, the head is lowered and the cups released. The quench plugs of press 95 are depressed through the open centers of the feeder head 647 (to be described) so that the cups are subjected to pressure and are flooded with quenching fluid. After a suitable timed interval, the press head is raised, the fingers of the feeder head are closed on the quenched work, and the work is raised. A draining interval is provided to permit the quench fluid to drain from the workpieces while they are held above the quench stations. Upon termination of that interval the feeder head is retracted, then rotated counterclockwise 90 degrees, and when aligned with the loading station for shuttle 94 advanced to a position over that station from which it is lowered to place the work parts on the work holders 585. The feeder head fingers are then released and elevated to clear the work.

At the time the cup feeder head 647 is lowered at the beginning of the cycle, a pair of magnetic heads in individual loader sections 652 and 653 (shown only schematically in FIG. IX) are also lowered each to engage the upper of two cones stacked on the workpiece mountings 585. These magnets are energized and after a suitable interval they are raised for example hydraulically (by means not shown) and shifted transversely of their rectangle 653 or 652 (by means not shown) to limits defined by the ends of those rectangles or by previously mounted workpieces therein. When fully loaded, the loader represented by rectangle 653 is advanced into alignment with that represented by rectangle 652 and the two are advanced in unison toward conveyor belt 654 on conveyor 102.

With the lift magnets of 652 and 653 up and the cup press feeder up, the discharge shuttle 94 is signaled to return to its "in" position. Upon advancing into the furnace it collapses the emptied cup work supports and returns them to the rotary hearth while positioning workpiece holders 585 in the loading station. The rotary hearth furnace 84 indexes to move the hook 508 of two cone trays 91 into registry with shuttle hook 573 while cup feeder 97 is retracting and rotating its feeder head 647 to carry the hot cups to cup press 95 and cone feeder 98 is withdrawing quenched cones from the drain-dwell position above cone quench station 646. Cone feeder head 649 is then rotated to a position above the work holders 585 on the rear of the carriage of shuttle 94, is lowered to place a set of two cones on each holder 585, is released from that pair of sets, and is elevated. When cone feeder 98 is positioned above shuttle 94 and freed of its cones, the shuttle carriage 577 retracts to convey the cones on holders 585 to the magnetic loaders 652 and 653 and to bring heated cones on the extended trays 91 beneath cone feeder head 649. Thus, the cone feeder 98 proceeds through a cycle as described for the cup feeder 97 in synchronism with the furnace 84, presses 95 and 96 and magnetic loaders 652 and 653 and alternately with cup loader 97. A sequence of operations for one cycle includes the transfer of hot cups to the cup feeder 97, the transfer by shuttle 94 of press quenched cups to the magnetic loaders 652 and 653, the removal of the cups by the feeder 97 and loaders 652 and 653, the repositioning to the "in" position of the shuttle 94, the transfer of press quenched cones to the "in" shuttle by feeder 98 and the transfer of cone work supports to the shuttle by rotary hearth 93, the transfer by shuttle 94 of the hot cones to the feeder 98 and of press quenched cones to the loader 652 and 653, the removal of the cones at the feeder 98 and loaders 652 and 653, the repositioning to "in" of the shuttle 94, the transfer of the press quenched cups to the shuttle 94 by feeder 97 and the transfer of a second pair of cup trays to the shuttle by rotary earth 93, the transfer by shuttle 94 of the second pair of hot cups to the feeder 97 and of the now quenched original cups to the magnetic loaders 652 and 653.

The general construction of feeders 97 and 98 is shown in FIG. X. Each comprises a fixed cylindrical stand 656 supported from a base 657 resting on a floor 658. A hollow splined shaft 659 is mounted for rotation and reciprocation within housing cylinder 656 and supports at its upper end a base 660 for feeder head 647 or 649. Splinder shaft 659 is coupled to an intermediate cylinder 662 which rotates therewith and within cylindrical stand 656 and with respect to which shaft 659 can be axially displaced.

Reciprocation of shaft 659 along its axis 648 or 650, as shown in FIG. IX, is accomplished by means of hydraulic cylinder 663 mounted below the level of floor 658 and on that axis. A piston (not shown) within cylinder 663 is coupled to a thrust bearing 664 by means of thrust plate 665 and piston rod 666. Thrust plate 665 is guided for reciprocation and confined to prevent rotation by guide rails 667 which extend parallel to the axis of the piston and are embraced in slots in the periphery of the plate 665. A pair of deceleration valves 668 and 661 are arranged for actuation by cam 670 carried by piston rod 666 so that the flow of hydraulic fluid to cylinder 663 is gradually cut off as the piston therein approaches its respective upper and lower limits of travel. As shown in FIG. X, shaft 659 is raised to its maximum height and thereby has its lower end immediately below annular oil seal 672 which is fastened to the lower flange 673 of casing 656.

Cylinder 662, concentric with shaft 659 and casing 656, embraces at its lower end an annular bearing 674 which embraces the outer surface of shaft 659 and is slidable therealong. The outer surface of cylinder 662 is embraced with tapered roller bearings 675 and 676 which respectively are mounted within casing 656 at its lower and upper ends to support cylinder 662 for rotation within the casing. A drive for rotating shaft 659 is coupled thereto from shaft 662 by means of splineways 677 on the upper end of shaft 659 and cooperating spline 678 on the inner periphery of pinion 679 secured to the upper flange 680 of shaft 662. As best seen in FIG. XI, pinion 679 is driven by the reciprocation of rack 682 coupled by piston rod 683 to driving piston 684. The maximum extension of rack 682 is determined by a combination of hydraulic deceleration valve 685 actuated by the rack borne cam 686 and by adjustable stop 687 engaging the end of the rack. The cooperating controls for the system (not shown) are actuated in response to the rotation of shaft 659 to the one of its operating positions corresponding to maximum piston rod extension by cam 688 secured to pinion 679, which engages limit switch 689. Similarly, the shaft limits for rotation in the counterclockwise direction are determined by cam 690 which actuates deceleration valve 692 and by adjustable stop 693 engaging cam arm 688. The controls are actuated when the counterclockwise limit is reached by the operation of limit switch 694 by cam 688.

Feeder head base 660 is secured to shaft 659 by a bolt 695 extending through a spindle 696 secured to base plate 697 upon which are mounted brackets 698 supporting upper and lower gibs 699 and 700 and an upper framework 702. A feeder head carriage 703 is mounted between base plate 697 and upper framework 702 for advancement from its retracted position as shown in FIG. X to the right. Carriage 703 rides on V ways 704 between gibs 699 and 700 as shown in the end view of the feeder head in FIG. XIII. It is made up of side channels 705 coupled as by end plate 706 shown broken away in FIG. XIII. A driving cylinder 707 is mounted on the upper framework 702 and is coupled to the end plate 706 by piston rod 708 whereby the carriage can be extended outward along rails 699 and 700 and retracted to its illustrated position. The hydraulic controls for cylinder 707 and the position sensing elements associated with the cylinder and carriage have not been shown since they correspond to those previously described.

Carriage 703 is shown in plan in FIG. XII. It includes a pair of ways 709 fitted in gibs 710 and arranged for reciprocation by means of cylinder 712 connected to slides through piston rods 713. The ends 714 of these slides each support a plate 715 from which depends a pickup finger 716. Pickup finger 716 cooperates with outer pickup fingers 717 to close upon and grasp workpieces when the associated ways 709 is advanced along carriage 703. Projecting from the pickup end of the feeder head is a framework 718 having open portions 719 in registry with the region within the pickup fingers to pass the mandrels of the quench press. Bell crank levers 720 are pivoted at 722 on framework 718 and have fingers 717 depending therefrom at their outer ends. The driving ends of the bell crank levers 720 support pins 723 on which are journaled cam followers 724 arranged to roll within cam slots 725 on cam plates 726 secured to slide end plate 715. Thus, when slide 709 is advanced to advance end plate 715 inner finger 716 moves forward and toward the center of open portion 719 and the bell crank levers 720 are rotated about their pivots 722 to move outer fingers 717 inward toward the center of open portion 719. Retraction of slide 709 releases a workpiece held by fingers 716 and 717 by causing those fingers to move away from each other.

When the feeder has been rotated into feeding alignment with its press and its feeder head has been advanced, it is necessary to precisely position the work units upon the press mandrel in order to index the workpieces properly during quenching and avoid malfunctions and possible damage to workpieces and equipment as the press is brought into engagement therewith. Indexing of the workpieces is effected by means of guide pin 727 which enters a hardened bushing 728, see FIG. IX, in the lower anvil of the quench press. The lower end 729 of guide pin 727 is tapered to facilitate its introduction into bushing 728.

A front elevation of a quench press typical of presses 95 and 96 is shown in FIG. XIV. It comprises a base 730, two columns 731 and 732, and a top 733 forming the frame of the press. Ways 734 and 735 are secured to each column to serve as a way for a cross head 736 of the press. Ways 737 and 738 slidably engage ways 734 and 735 respectively and couple upper and lower cross bars 739 and 740 of cross head 736. The cross head is moved up and down in the ways 734 and 735 by a pair of small hydraulic cylinders 748 and their rams shown in their extended position. Hydraulic fluid for actuating rams 744 and 745 is supplied to cylinders 742 and 743 by means of conduits 746 and 747.

Paired workpieces are quenched in the press in side by side relationship as a pair of cups or a pair of cone stacks each consisting of two cones. Each of the workpieces or workpiece stacks is mounted on the main anvil or platen 750 of the press. These mountings are within quench rings 752 which are flooded with quenching fluid during quenching. Plugs or press mandrels 753 are advanced by means of hydraulic pressure applied to cylinders 748 to a position inserting them within the workpieces. The mandrels confine the workpieces to a predetermined configuration while they are flooded with fluid in the quench stations. The quench rings and their operating elements are best seen in FIGS. XV and XVI. FIG. XVI is a side elevation sectioned substantially along line XVII—XVII above anvil 750 and sectioned substantially along line XVI—XVI below the anvil.

Mounted on the base 730 of the press are a pair of gudgeons 754 through which extends a shaft 755 supporting quench ring frame 756. Two quench rings 752 are mounted within that frame, as best seen in FIG. XV. In operation, the hot workpieces are flooded virtually instantaneously to insure a uniform quench over their entire body. Quench fluid is maintained adjacent the quench stations within rings 752 by means of the manifold 757 formed by the hollow interior of quench ring frame 756 in cooperation with the outer wall 758 of the quench rings. A seal is effected between the rings and frame by ring flanges 759 secured to the frame by bolts 760 and sealed thereto by gaskets 762. Several sizes of quench rings can be accommodated in the frame and are interchangeable by virtue of the flanged connections.

Normally the rings and frame are permitted to remain on the press base during quenching operations since work is admitted to the quench stations by the feeder through the upper open portions thereof. However, maintenance may require their removal from the anvil. This is accomplished by raising the frame around shaft 755 by means of a pinion 763 secured thereto and driven from hydraulic cylinder 764 through rack 765. The quench fluid conduit 766 to manifold 757 is not disrupted by the pivoting of frame 756 on shaft 755 since it is connected to its main supply (not shown) through a swivel joint 767 having its axis on the axis of shaft 755.

Fluid is passed through quench rings 752 from manifold 757 to the quench stations at appropriate instants in the press quenching cycle by means of valves disposed about the periphery of the rings. The valves each comprise a bore 768 parallel to the axes of the rings and disposed peripherally around the rings within their walls. Spindles 769 are fitted within the bores over a substantial portion of their lengths as best seen in FIG. XVI. A plurality of radial bores 770 (only one set being shown in FIG. XVI) in the walls of rings 752 intersect each axial bore 768 to form passages from the manifold 757 to the quench station. These passages are ordinarily closed by the enlarged portions of the spindles 769 to bar the passage of fluid to the interior of the rings. The passages are opened by axially displacing the spindles 769 so that the spaced portions 772 of reduced diameter are in registry with radial bores 770.

Rapid flooding of the workpieces is accomplished by opening all of the valves in the quenching walls simultaneously with the opening of valve 773 feeding a port 774 in the center of the quench press platen. The ring valves are opened by raising a valve operating ring 775 against which the ends of spindles 769 are biased by springs 776. Two pairs of pins 777 are journaled for reciprocation through the platen to raise valve operating ring 775. A shaft 778 actuates the pins upon rotation by means of a rack 779 and pinion 780 drive coupled to a hydraulic cylinder 782 to rotate an eccentric 783 thereon and displace links 784 coupled thereto to the left as shown in FIG. XVI. This displacement straightens toggle links 785 coupled between fixed pivots 786 and pins 777 to raise those pins. Another eccentric 787 through link 788 displaces link 789 to the right around its fixed pivot 790 to depress actuating plunger 792 for valve 773 thereby opening that valve as the quench ring valves are opened. Thus the quench ring is simultaneously flooded from its center and its periphery.

Hydraulic cylinder 782 is driven to the valve opening position in response to the master control for the system. This control function is initiated in response to the advancement of plugs 753 into engagement with the workpieces which, in turn, is initiated in response to the mounting of the workpieces in the quenching stations by the press feeder and the release of those workpieces by the press feeder pickup fingers. As in the previous control functions, the means for accomplishing those results is conventional once the sequences are determined, and therefore are not shown.

Operation of the press is synchronized with press loader operation so that the press cross head is raised sufficiently to permit access of the feeder head and workpieces to the region above the quench stations when the feeder is rotated into alignment with the quench stations and advanced. As the feeder head is lowered within the press so that fingers 716 and 717 enter quench rings 752 while grasping the hot workpieces, the press cross head 736 begins to lower itno position so that as fingers 716 and 717 of the head release the workpiece, backing off into slots 781 in the quench ring walls, the mandrels 753 are advanced into the centers of the workpieces and the quench rings 752 are flooded with quench fluid.

After a suitable quench interval, the quench valves are closed by reversal of the hydraulic drive of cylinder 782 and the quench fluid is permitted to flow from ports 793 in the quench ring frame below the lower limit of the quench rings and thence across the platen to trough 794 from which it is returned to its reservoir. This flow occurs during quenching, however, fluid is supplied to the quench station at a much greater rate than it escapes therefrom through ports 793 and therefore some of the excess even flows over the upper lip of the quench rings and quench frame and thence across the platen to the trough from which it is reused after suitable cleaning.

The controls then raise the press plugs 753, close the lift fingers 716 and 717 of the press feeder and cause the feeder to lift the quenched work to a drain dwell above the quench stations. After a suitable drain interval, the feeder head is retracted, rotated to a position aligned with the shuttle 94, advanced to a position superjacent the work holders 585, lowered, and the fingers 716 and 717 opened. When the work is placed on work holders 585 of discharge shuttle 94, the shuttle transfers it to the magnetic loaders 652 and 653 of loader 101 for conveyor 102.

The above described system of subjecting workpieces to a hardening heat treatment and feeding them to appropriate quench pressing stations lends itself to numerous alterations and substitutions within the inventive concepts embraced herein. Accordingly, it is to be understood that this description is intended to illustrate the invention and should not be read in a limiting sense. Further, the specific pieces of equipment can be modified, numerous forms of controls are adaptable to the system, and additional processing features can be added to the system without departing from its spirit and scope.

We claim:

1. In combination, a furnace for heating first and second cooperating workpieces, a first quench press for first workpieces having a pair of quenching stations with a given spacing, a second quench press for second workpieces having a pair of quenching stations with said given spacing, a plurality of paired work supports for mounting pairs of said workpieces with a selectively variable spacing ranging from a minimum to said given spacing, a coupling between said paired work supports enabling selective variation of said spacing, means for conveying said paired work support mounted workpieces through said furnace, means for alternately introducing pairs of said first and second support mounted workpieces into said furnace with said minimum support spacing, means for withdrawing said support mounted workpiece from said furnace and substantially simultaneously altering the spacing of said supports to said given spacing, and means to transfer alternately from said withdrawing means, pairs of said first workpieces to said first quench press and pairs of said second workpieces to said second quench press.

2. In combination a furnace, a quench press having a pair of quenching stations with a given spacing, a pair of coupled work supports, means for conveying paired workpieces through said furnace on said work supports, means for reducing the spacing between said supports to a spacing less than said given spacing, means for introducing said workpieces on said supports to said furnace with said reduced spacing, means for withdrawing said support mounted workpieces from said furnace and substantially simultaneously altering the spacing of said workpieces to said given spacing, and means to transfer said workpieces from said withdrawing means to respective quenching station in said press.

3. In combination a furnace, a quench press having a pair of quenching stations, a pair of work supports aligned on a charging path for said furnace, a coupling between said paired work supports permitting the spacing therebetween to be varied, a charge shuttle for engaging the outer work support to advance and retract it along the furnace charging path, means to advance said shuttle and insert a pair of workpieces mounted on paired work supports into said furnace, a retractor for said shuttle to retract said shuttle from its limit of advancement and release said outer work support, means for moving said workpiece loaded, paired, work supports out of the range of engagement with said shuttle while in said furnace and for moving an empty pair of work supports into the range of engagement of said shuttle, means to actuate retraction of said charge shuttle from said furnace and thereby withdraw an empty pair of work supports therefrom, means to grasp the innermost support when said charge shuttle is at its limit of retraction, means to advance said retracted charge shuttle a given distance to collapse said outermost support upon said innermost support, a discharge shuttle operating along a discharge path from said furnace, means to move the outermost support of a workpiece loaded pair of work supports into the range of engagement of said discharge shuttle, means to retract said discharge shuttle and withdraw said workpiece loaded pair of work supports along said discharge path, means to grasp and retard outward motion of said innermost work support whereby said work supports are separated to the limit defined by said coupling during retraction of said discharge shuttle, said limit of separation corresponding to the separation of said pair of quenching stations, a quench press loader adjacent said discharge shuttle, and control means for said quench press loader to operate said loader to transfer workpieces from work supports on said discharge shuttle to said quenching stations in said quench press.

4. In combination a furnace, a pair of work supports aligned on a charging path for said furnace, a coupling between said paired work supports permitting the spacing therebetween to be varied, a charge shuttle for engaging the outer work support to advance and retract it along the furnace charging path, means to advance said shuttle and insert a pair of workpieces mounted on paired work supports into said furnace, a spring retractor for said shuttle to retract said shuttle from its limit of advancement and release said outer work support, means for moving said workpiece loaded paired work supports out of the range of engagement with said shuttle while in said furnace and for moving an empty pair of work supports into the range of engagement of said shuttle, means to actuate retraction of said charge shuttle from said furnace and thereby withdraw an empty pair of work supports therefrom, means to retard motion of the innermost support when on said charge shuttle, and means effective when said charge shuttle is at its limit of retraction to advance said retracted charge shuttle a given distance to collapse said outermost support upon said retarded innermost support.

5. In combination a furnace, a quench press having a pair of quenching stations, a pair of work supports, a coupling between said paired work supports permitting the spacing therebetween to be varied, a discharge shuttle operating along a discharge path from said furnace, means to move the outermost support of a workpiece loaded pair of work supports having a spacing less than the limit defined by the coupling into the range of engagement of said discharge shuttle, means to retract said discharge shuttle and withdraw said workpiece loaded pair of work supports along said discharge path, means to grasp and retard outward motion of said innermost work support whereby said work supports are separated to said limit during retraction of said discharge shuttle, said limit of separation corresponding to the separation of said pair of quenching stations, a quench press loader adjacent said discharge shuttle, and control means for said quench press loader to operate said loader to transfer workpieces from work supports on said discharge shuttle to said quenching stations in said quench press.

6. In combination a furnace, a quench press having a pair of quenching stations, a pair of work supports aligned in said furnace, a coupling between said paired work supports permitting the spacing therebetween to be varied, a discharge shuttle operating along a discharge path from said furnace, a workpiece support engaging means on the furnace end of said shuttle, means to move a workpiece loaded pair of work supports having a spacing less than the limit defined by said coupling in said furnace which are aligned with said discharge path and have the outermost support in the range of engagement of said engaging means of said discharge shuttle, means to retract said discharge shuttle and withdraw from said furnace said workpiece loaded pair of work supports along said discharge path, means to grasp and retard outward motion of said innermost work support whereby said work supports are separated to said limit during retraction of said discharge shuttle, said limit of separation corresponding to the separation of said pair of quenching stations, means for transferring workpieces from said pair of work supports on said discharge shuttle to said quenching stations in said quench press, a pair of workpiece holders on the shuttle in spaced relationship to said furnace end of said shuttle, means to transfer quenched workpieces from said quenching stations to said workpiece holders while said furnace end of said shuttle is extended into the furnace, an unloading station for workpieces and means to remove said workpieces from said holders at said unloading station when said shuttle is retracted from said furnace.

7. In combination a furnace, a quench press having a pair of quenching stations, a pair of work supports aligned on a charging path for said furnace, a coupling between said paired work supports permitting the spacing therebetween to be varied. a charge shuttle for engaging the outer work support to advance and retract it along the furnace charging path, means to advance said shuttle and insert a pair of workpieces mounted on paired work supports into said furnace, a spring retractor for said shuttle to retract said shuttle from its limit of advancement, means for moving said workpiece loaded paired work supports out of the range of engagement with said shuttle while in said furnace and for moving an empty pair of work supports into the range of engagement of said shuttle, means to actuate retraction of said charge shuttle from said furnace and thereby withdraw an empty pair of work supports therefrom, means to grasp the innermost support when said charge shuttle is at its limit of retraction, means to advance said retracted charge shuttle a given distance to collapse said outermost support upon said innermost support, a discharge shuttle operating along a discharge path from said furnace, workpiece support engaging means on said shuttle, means to move the outermost support of a workpiece loaded pair of work supports into the range of said discharge shuttle engaging means, a workpiece transfer station, means to retract said discharge shuttle a given distance and withdraw said workpiece loaded pair of work supports along said discharge path to said transfer station, means to grasp and retard outward motion of said innermost work support whereby said work supports are separated to the limit defined by said coupling during retraction of said discharge shuttle, said limit of separation corresponding to the separation of said pair of quenching stations, means for transferring workpieces from work supports on said discharge shuttle at said transfer station to said quenching stations in said quench press, a pair of workpiece holders on said discharge shuttle said given distance from said engaging means, an unloading station said given distance along said shuttle path from said transfer station, means for transferring quenched paired workpieces from said quenching stations to said workpiece holders while said holders are at said transfer station, and means for unloading said paired workpieces from said holders while said holders are at said unloading station.

8. In combination a furnace, work support means a discharge shuttle for withdrawing said work support means containing heated workpieces from said furnace, a quench press for heated workpieces, a quench press loader, a pickup head for said loader, means to position said pickup head in proximity with said work support means for engagement with said heated workpieces, means to engage said pickup head with said heated workpieces, a platen in said quench press for supporting a workpiece, a work engaging member advanced by said quench press toward said platen to engage a workpiece mounted thereon, means to position said pickup head and workpieces in said quench press for engagement by said work engaging member, means to cause said pickup head to release said workpiece, said pickup head having an open portion through which said work engaging member can pass to engage said workpiece, means to engage said pickup head with said workpiece after said piece has been engaged by said work engaging member, and means to move said pickup head and a workpiece held thereby out of said quench press subsequent to the engagement of said workpiece by said work engaging member.

9. In combination a furnace, work support means a discharge shuttle for withdrawing said work support means containing heated workpieces from said furnace, a quench press for heated workpieces, a quench press loader, a pickup head for said loader, means to position said pickup head in proximity with said work support means for engagement with said heated workpieces, means to engage said pickup head with said heated workpiece, a platen in said quench press for supporting a workpiece, a work engaging member advanced by said quench press toward said platen to engage a workpiece mounted thereon, means to position said pickup head and workpieces in said quench press for engagement by said work engaging member, said pickup head having an open portion through which said work engaging member can pass to engage said workpiece, and means to move said pickup head and a workpiece held thereby out of said quench press subsequent to the engagement of said workpiece by said work engaging member.

10. Apparatus comprising, in combination, a furnace, a quench press having a plurality of spaced mandrels, first and second work supports, means effective to couple said first work support to said second work support in both of two different relative positions, and means for conveying coupled first and second work supports to, through and from said furnace and to a loading station for said quench press, and effective in cooperation with said coupling means to convey said coupled work supports through said furnace in the first of said relative positions and then to shift said work supports to the second of said relative positions, said second relative position providing a distance between workpieces on said first and second work supports equal to the distance between mandrels, and to deliver said work supports to the loading station for said quench press in the second relative position.

11. In combination, a furnace having a limited volume, a quench press having spaced mandrels, a pair of work supports, a coupling between said paired work supports enabling variation in the spacing therebetween from a minimum while said work supports are in said furnace to a maximum equal to the spacing between the mandrels, conveyor means for moving said work supports into and out of said furnace to and from said quench press, means on said conveyor means for engaging a first one of said work supports, driving means for such engaging means to impart motion thereto and to said first work support in a direction away from the second of said work supports whereby said work supports tend to separate to said maximum spacing, means tending to retard motion of the second work support, and means to advance said first work support toward said second work support while said retarding means is effective on said second work support to reduce the spacing of said paired work supports to said minimum.

12. A combination in accordance with claim 11 wherein said means to advance said first work support toward said second work support advances said first work support to abut said second work support before both said work supports enter the furnace.

13. A combination in accordance with claim 12 wherein said means to retard motion of said second work support comprises a pair of shoes on opposite sides of said conveyor means and engagable with the sides of said work support while said second work support is outside the furnace adjacent the quench press.

14. In combination, a furnace having a limited volume, a quench press having spaced mandrels, a pair of work supports, a coupling between said paired work supports enabling variation in the spacing therebetween, conveyor means for said work supports, means on said conveyor means for engaging one of said work supports, driving means for said engaging means to move said work supports along said conveyor means, and means for retarding motion of said work supports along said conveyor means cooperating with said driving means to establish a separation of said paired work supports equal to the spacing between said mandrels.

15. A combination according to claim 14 wherein the retarding means comprises a pair of spaced shoes for engaging opposite sides of the work support while said work support is outside the furnace.

16. A combination according to claim 14 wherein said retarding means comprises a fixed shoe extending along one side of the work support path on said conveyor means between the furnace and the quench press, a shoe movable transversely of said work support path extending along the work support path opposite the fixed shoe, and means biasing said movable shoe toward said fixed shoe.

17. In combination a furnace, a quench press having spaced mandrels, a platen in said quench press for supporting workpieces to be quenched, a pair of work supports, a coupling between said paired work supports enabling variation in the spacing therebetween, transfer means for withdrawing said paired work supports from said furnace and adjusting said paired work supports so that the distance between heated work thereon is equal to the spacing between said mandrels, pickup means for engaging said spaced workpieces and moving them to said platen aligned with said mandrels, said pickup means having an open portion through which said mandrels can pass to engage said workpieces, and means for moving said mandrels through said open portion into engagement with said workpieces.

18. In combination a furnace, a quench press having spaced mandrels, a platen in said quench press for supporting workpieces to be quenched, work support means, transfer means for withdrawing said work support means containing a pair of heated workpieces from said furnace and transferring said pair of heated workpieces to said platen spaced apart a distance equal to the spacing between said mandrels and aligned with said mandrels, said transfer means having an open portion through which said mandrels can pass to engage said workpieces, and means for moving said mandrels through said open portion into engagement with said workpieces.

19. In combination a furnace, a quench press, a platen in said quench press for supporting workpieces to be quenched, work support means, transfer means for withdrawing said work support means containing a heated workpiece from said furnace, a press loader, a pickup head for said loader, means to position said pickup head for engagement with said workpiece withdrawn from said furnace on said work support means and to move said workpiece to said platen, a work engaging member advanced by said quench press toward said platen to engage a workpiece mounted thereon, means to position said pickup head and workpiece in said quench press for engagement by said work engaging member, said pickup head having an open portion through which said work engaging member can pass, and means for moving said work engaging member through said open position into engagement with said workpiece.

20. Apparatus according to claim 19 wherein said pickup head releases said workpiece as said work engaging member is advanced through said open position into engagement with said workpiece.

References Cited in the file of this patent
UNITED STATES PATENTS

| | | |
|---|---|---|
| 1,696,806 | Lehr | Dec. 25, 1928 |
| 1,771,641 | Lamb | July 29, 1930 |
| 1,848,898 | McFarland | Mar. 8, 1932 |
| 1,853,952 | Batie | Apr. 12, 1932 |
| 2,223,603 | Darrah | Dec. 3, 1940 |
| 2,338,784 | Ruckstahl | Jan. 11, 1944 |
| 2,346,583 | Jackson | Apr. 11, 1944 |
| 2,368,615 | Reese | Feb. 6, 1945 |
| 2,407,062 | Darrah | Sept. 3, 1946 |
| 2,426,105 | Kemock | Aug. 19, 1947 |
| 2,601,980 | Menough | July 1, 1952 |
| 2,610,746 | Steck | Sept. 16, 1952 |
| 2,726,077 | Dow | Dec. 6, 1955 |
| 2,740,515 | Wilson | Apr. 3, 1956 |
| 2,741,374 | Moran | Apr. 10, 1956 |
| 2,790,530 | Stoltz | Apr. 30, 1957 |
| 2,822,162 | Bastress | Feb. 4, 1958 |
| 2,850,141 | Bishop et al. | Sept. 2, 1958 |
| 2,856,054 | Fausett | Oct. 14, 1958 |